United States Patent [19]
Yokoyama et al.

[11] Patent Number: 5,345,410
[45] Date of Patent: Sep. 6, 1994

[54] ARITHMETIC-LOGIC UNIT WITH MODULO ADDITION/SUBSTRACTION FUNCTION AND MICROPROCESSOR USING THE SAME

[75] Inventors: Tatsuya Yokoyama; Tetsuhiko Hirata, both of Machida, Japan

[73] Assignee: Hitachi, Ltd., Tokyo, Japan

[21] Appl. No.: 890,712

[22] Filed: May 29, 1992

[30] Foreign Application Priority Data

May 30, 1991 [JP] Japan .................. 3-127187

[51] Int. Cl.$^5$ ............................. G06F 7/72
[52] U.S. Cl. ............................. 364/746
[58] Field of Search ............ 364/146; 340/146.2

[56] References Cited

U.S. PATENT DOCUMENTS

| | | | |
|---|---|---|---|
| 4,722,067 | 1/1988 | Williams | 364/746 |
| 4,742,479 | 5/1988 | Kloker et al. | 364/746 |
| 4,744,043 | 5/1988 | Kloker | 364/746 |

FOREIGN PATENT DOCUMENTS 103552   6/1982   Japan .

Primary Examiner—David H. Malzahn
Attorney, Agent, or Firm—Antonelli, Terry, Stout & Kraus

[57] ABSTRACT

An arithmetic-logic unit ALU having three data input ports A, B and C, a modulo adder/subtracter for executing an arithmetic-logic operation of $(A \pm B) \bmod (C+1)$, a comparator for determining whether the input data A, B and C satisfy at least one of the relationship of $A \leq B \leq$, $A \leq B < C$, $A < B \leq C$ and $A < B < C$ from a modulo operation viewpoint, and outputting a comparison judgment signal, a two-input ALU for executing an arithmetic-logic operation of two data, and one data output port for outputting operation results.

23 Claims, 35 Drawing Sheets

FIG. 4A DT

CONTROL INFORMATION: LI | DT CODE | DST-REF | EOT / NR | VARIABLE FIELD | USER DATA

FIG. 4B AK

CONTROL INFORMATION: LI | AK CODE / CDT | DST-REF | O / NR | VARIABLE FIELD

FIG. II A

MADD (MSUB)

| INST | S1 | S2 | MOD | DST |

FIG. II B

MCMPn

| INST | S1 | S2 | S3 | ADR |

FIG. 20

| COMPARATOR | INPUT CONDITION | OUTPUT SIGNAL | |
|---|---|---|---|
| A : B | A<B | A<B: 1 | A>B: 0 |
|  | A>B | 0 | 1 |
|  | A=B | 0 | 0 |
| B : C | B<C | B<C: 1 | B>C: 0 |
|  | B>C | 0 | 1 |
|  | B=C | 0 | 0 |
| A : C | A<C | A<C: 1 | A>C: 0 |
|  | A>C | 0 | 1 |
|  | A=C | 0 | 0 |

| INPUT SIGNALS | | | | OUTPUT SIGNAL |
|---|---|---|---|---|
| A>B | B<C | A<C | A>C | TF |
| 0 | 0 | 0 | 0 | 0 |
| 0 | 0 | 0 | 1 | 1 |
| 0 | 0 | 1 | 0 | 0 |
| 0 | 1 | 0 | 0 | 0 |
| 0 | 1 | 0 | 1 | 1 |
| 0 | 1 | 1 | 0 | 1 |
| 1 | 0 | 0 | 0 | 0 |
| 1 | 0 | 0 | 1 | 0 |
| 1 | 0 | 1 | 0 | 0 |
| 1 | 1 | 0 | 0 | 0 |
| 1 | 1 | 0 | 1 | 1 |
| 1 | 1 | 1 | 0 | 0 |

| INPUT SIGNALS | | | OUTPUT SIGNAL |
|---|---|---|---|
| A>B | B>C | A<C | TF |
| 0 | 0 | 0 | 1 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 0 |

| INPUT SIGNALS | | | | OUTPUT SIGNAL |
|---|---|---|---|---|
| A<B | B>C | A>C | A<C | TF |
| 0 | 0 | 0 | 0 | 0 |
| 0 | 0 | 0 | 1 | 0 |
| 0 | 0 | 1 | 0 | 1 |
| 0 | 1 | 0 | 0 | 0 |
| 0 | 1 | 0 | 1 | 0 |
| 0 | 1 | 1 | 0 | 0 |
| 1 | 0 | 0 | 0 | 0 |
| 1 | 0 | 0 | 1 | 1 |
| 1 | 0 | 1 | 0 | 1 |
| 1 | 1 | 0 | 0 | 0 |
| 1 | 1 | 0 | 1 | 0 |
| 1 | 1 | 1 | 0 | 1 |

| INPUT SIGNALS | | | | OUTPUT SIGNAL |
|---|---|---|---|---|
| A<B | A<C | A>C | B<C | TF |
| 0 | 0 | 0 | 0 | 0 |
| 0 | 0 | 0 | 1 | 0 |
| 0 | 0 | 1 | 0 | 0 |
| 0 | 0 | 1 | 1 | 1 |
| 0 | 1 | 0 | 0 | 0 |
| 0 | 1 | 0 | 1 | 0 |
| 1 | 0 | 0 | 0 | 0 |
| 1 | 0 | 0 | 1 | 0 |
| 1 | 0 | 1 | 0 | 1 |
| 1 | 0 | 1 | 1 | 1 |
| 1 | 1 | 0 | 0 | 0 |
| 1 | 1 | 0 | 1 | 1 |

ARITHMETIC-LOGIC UNIT WITH MODULO ADDITION/SUBSTRACTION FUNCTION AND MICROPROCESSOR USING THE SAME

BACKGROUND OF THE INVENTION

1. Field of the Invention

The present invention relates to an arithmetic-logic unit (hereinafter called ALU) for processing given data, and a microprocessor and data processing unit using the ALU. More particularly, the present invention relates to an ALU, microprocessor and data processing unit having an operation function suitable for processing a communications protocol.

2. Description of the Related Art

A microprocessor or data processing unit has an embedded ALU which has a function of performing arithmetic operations such as addition, subtraction, multiplication and division of generally two numeric values, and of performing a logical operation such as AND and OR of numeric values. Such microprocessors or data processing units are used in various technical fields. An example is a communication controller.

In the field of communications networks, a communications protocol including flow control and error recovery requires modulo operations such as modulo comparison and modulo addition/subtraction in order, for example, to judge whether numeric data B cyclically changing its value within a predetermined range has a predetermined relation to boundary data A and C. If such a modulo operation is executed by a conventional microprocessor having only a function of processing two values, a number of instruction steps become necessary in order to obtain desired operation results, being unable to speed up processing a communications protocol.

As a conventional technique for speeding up a comparison operation between three values, there has been proposed an arithmetic-logic unit (ALU) of the type described, for example, in JP-B-63-12302. This ALU can judge whether two real number data A and B satisfy a relation of $A-C \leq B \leq A+C$ (C is an allowable error).

However, this conventional ALU has only a function of simply comparing three input values (hereinafter called three-input), and is not provided with a function of performing a modulo addition, subtraction, or comparison operation between three inputs, necessary for processing a communications protocol. It is therefore necessary for this conventional ALU to execute a number of instruction steps in order to process a communications protocol, being unable to realize high speed processing.

SUMMARY OF THE INVENTION

It is an object of the present invention to provide an arithmetic-logic unit (ALU) capable of readily executing a modulo addition, subtraction or operation between numeric data, necessary for processing a communications protocol.

It is another object of the present invention to provide a microprocessor or data processing unit capable of readily executing a modulo addition, subtraction or comparison operation between numeric data, necessary for processing a communications protocol.

In order to achieve the above objects of the present invention, a microprocessor or data processing apparatus is provided with a specific instruction for executing a modulo addition, subtraction or comparison, and a modulo operation function.

A modulo addition/subtraction instruction has, for example, an instruction field (INST) for indicating the type of operation, parameter fields (S1, S2) for indicating the locations of operation data, e.g., the numbers of general registers, a parameter field (MOD) for indicating the location of mask data necessary for modulo operation, and a parameter field (DST) for indicating an area where operation results are stored. A modulo comparison instruction has the format constructed of, for example, an instruction field (INST) and parameter fields (S1, S2, S3) for indicating the locations of comparison data.

In order to execute such a specific instruction, the microprocessor of the present invention is provided with a two-input (two values) ALU similar to a conventional microprocessor, a three-input (three values) ALU for executing a modulo operation for three inputs, and three data input ports A, B and C connected to the internal bus of the microprocessor.

More specifically, the three-input ALU is activated upon reception of an instruction to execute a modulo operation. The three-input ALU is constructed of a modulo adder/subtracter for executing an operation of $(A \pm B)$ mod $(C+1)$ for the data A, B and C input via the input ports, and a three-input comparator for judging whether the input data A, B and C satisfy at least one of the following of $A \leq B \leq C$, $A \leq B < C$, $A < B \leq C$, and $A < B < C$ from the modulo operation viewpoint. The two-input ALU is supplied with two input data from the input data ports A, B and C. The operation results from one of the two-input and three-input ALUs are selectively output from the microprocessor ALU in accordance with the type of an executed instruction.

According to the present invention, a modulo addition, subtraction or comparison necessary for processing a communications protocol can be executed by a single instruction (e.g., a modulo addition/subtraction instruction or three-input comparison instruction), thereby speeding up the operation. If the internal bus of the microprocessor of the present invention is structured to have four independent busses for three ALU input data and one ALU output data, it is possible to supply data necessary for modulo operation in parallel to ALU, thereby speeding up the modulo operation.

The foregoing and other objects, advantages, manner of operation and novel features of the present invention will be understood from the following detailed description of the preferred embodiments of the invention when read in conjunction with the accompanying drawings.

BRIEF DESCRIPTION OF THE DRAWINGS

FIGS. 4A and 4B show the formats of a DT packet and AK packet of TP4.

Figs. 11A and 11B show the formats of micro-instructions for modulo addition/subtraction and comparison operations to be executed by the microprocessor.

FIG. 20 is a table showing the function of the comparators 451 to 453 constituting the three-input comparator 450.

FIG. 22 is a table showing the function of the $A \leqq B < C$ judgment circuit 454.

FIG. 24 is a table showing the function of the $A \leqq B \leqq C$ judgment circuit 455.

FIG. 26 is a table showing the function of the $A < B \leqq C$ judgment circuit 456.

FIG. 28 is a table showing the function of the $A < B < C$ judgment circuit 457.

DESCRIPTION OF THE PREFERRED EMBODIMENTS

Figure 1:
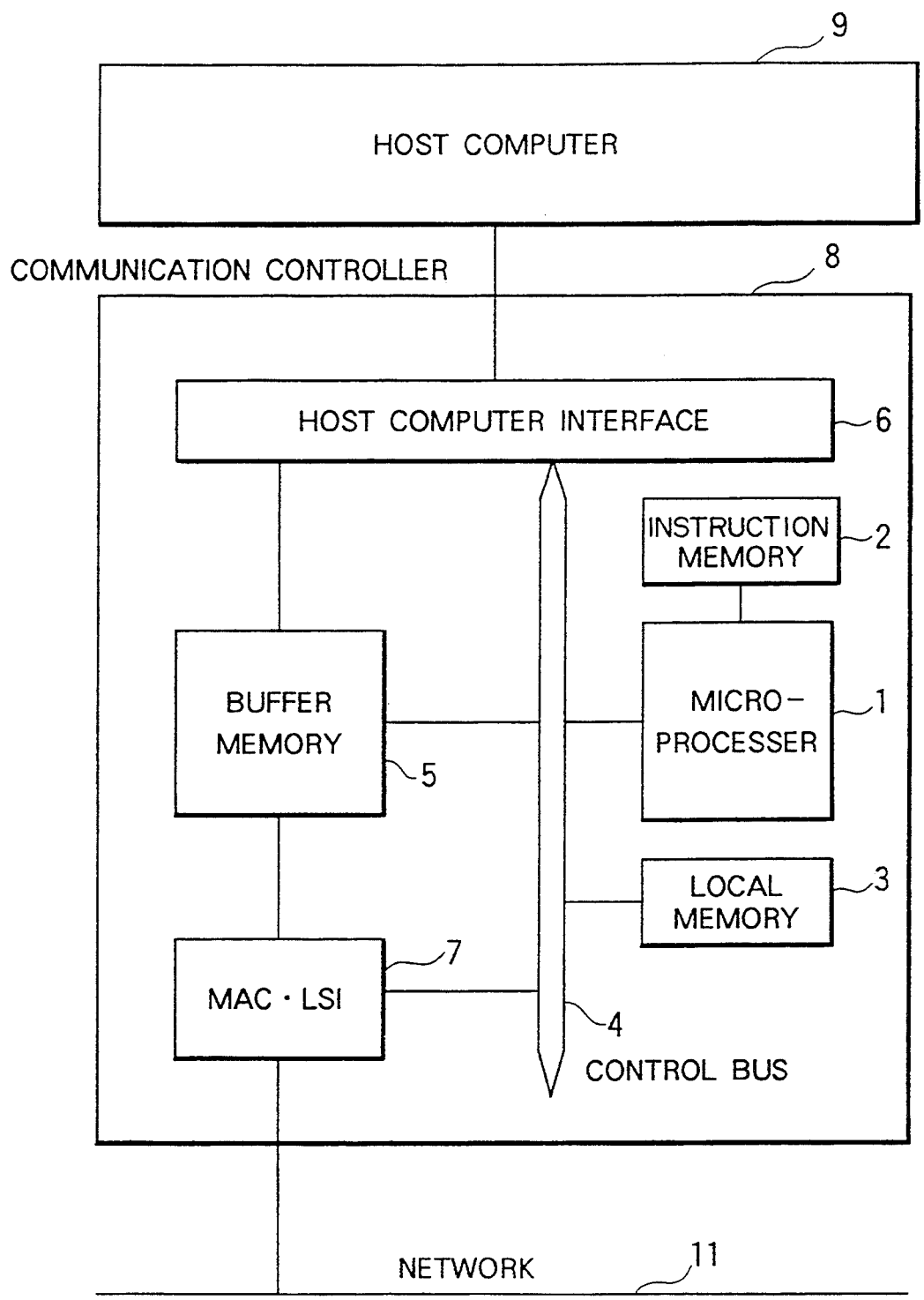
FIG. 1 is a block diagram showing the structure of a communication controller having a microprocessor of the present invention.

1st Embodiment:

FIG. 1 is a block diagram showing an example of a communication controller having a microprocessor of the present invention.

A communication controller 8 is connected between a host computer 9 and a network 11. The communication controller 8 is constructed of a microprocessor 1, an instruction memory 2, a local memory 3, a buffer memory 5, a host computer interface 6, an MAC.LSI 7 and a control bus 4. The instruction memory 2 stores instruction sets (microprograms) to be executed by the microprocessor 1. The buffer memory 5 stores data to be transmitted, and received data. The MAC.LSI 7 interfaces with the network 11. The host computer interface 6 interfaces with the host computer 9. The control bus 4 interconnects the microprocessor 1, local memory 3, buffer memory 5, MAC.LSI 7 and host computer interface 6. The microprocessor 1 controls communications by processing a communications protocol or the like, in accordance with instruction sets stored in the instruction memory 2.

Figure 2:
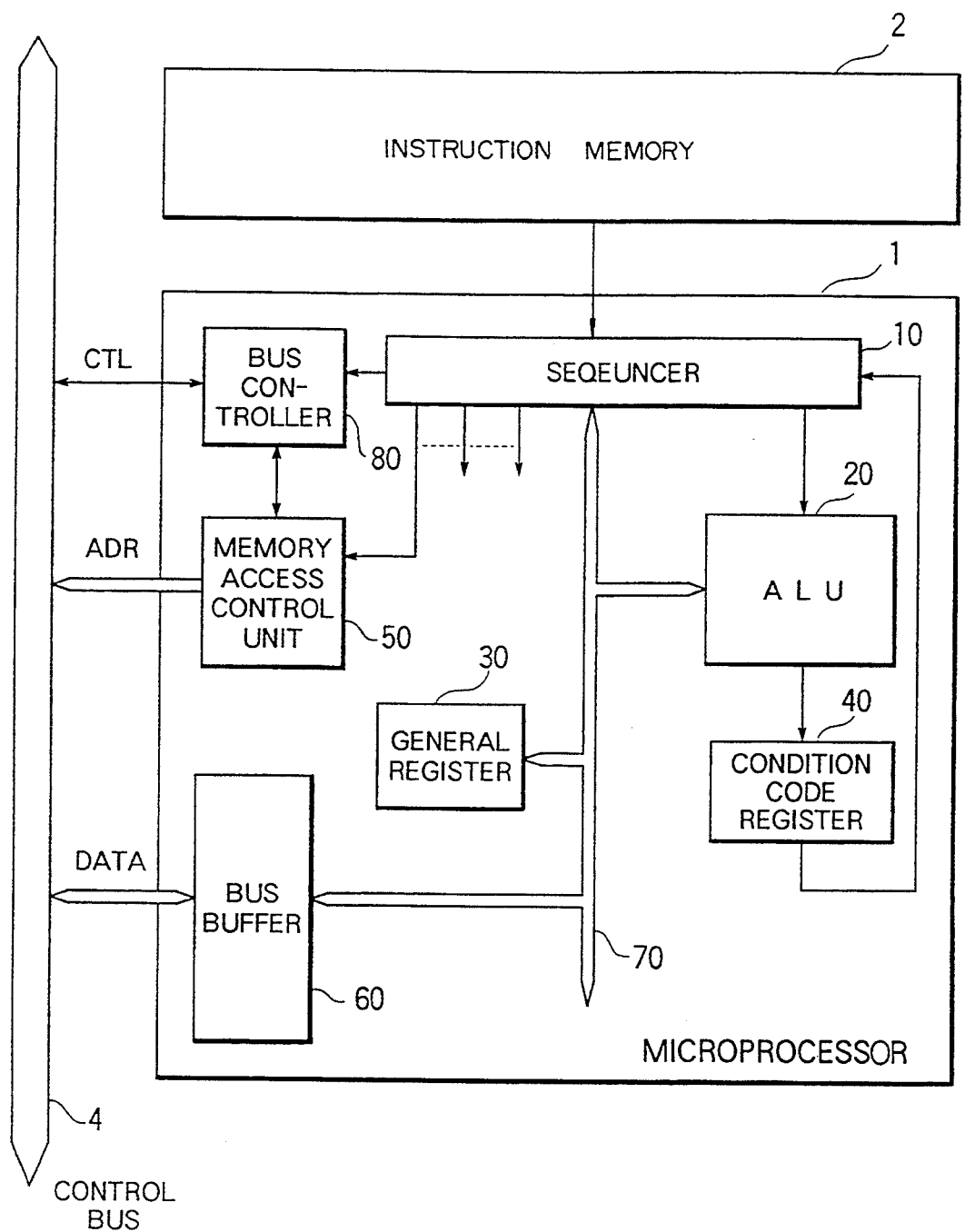
FIG. 2 is a block diagram showing the detailed structure of the microprocessor shown in FIG. 1.

FIG. 2 is a block diagram showing the detailed structure of the microprocessor 1 shown in FIG. 1. The microprocessor 1 is constructed of a sequencer 10, a memory access control unit 50, a bus controller 80, an ALU 20, condition code registers 40, general registers 30, a bus buffer 60 and an internal data bus 70. The sequencer 10 controls the internal operations of the microprocessor 1 in accordance with an instruction read from the external instruction memory 2. The memory access control unit 50 controls access to the external buffer memory 5 and local memory 3. The bus controller 80 interfaces with the control bus 4. The ALU 20 is provided with a function of executing high speed modulo operations to be described later. The condition code registers 40 temporarily store comparison operation results. The general registers 30 temporarily store operation data. The bus buffer 60 temporarily stores memory-accessed data. The internal data bus 70 interconnects the general registers 30, ALU 20, sequencer 10 and bus buffer 60.

The function of ALU 20 will be described below, the function of ALU 20 being provided when the microprocessor 1 executes the Transport Protocol, Class 4 (hereinafter called TP4) of the Open Systems Interconnection (OSI) communication protocol (Layer 4). First, the outline of TP4 will be described.

Figure 3:
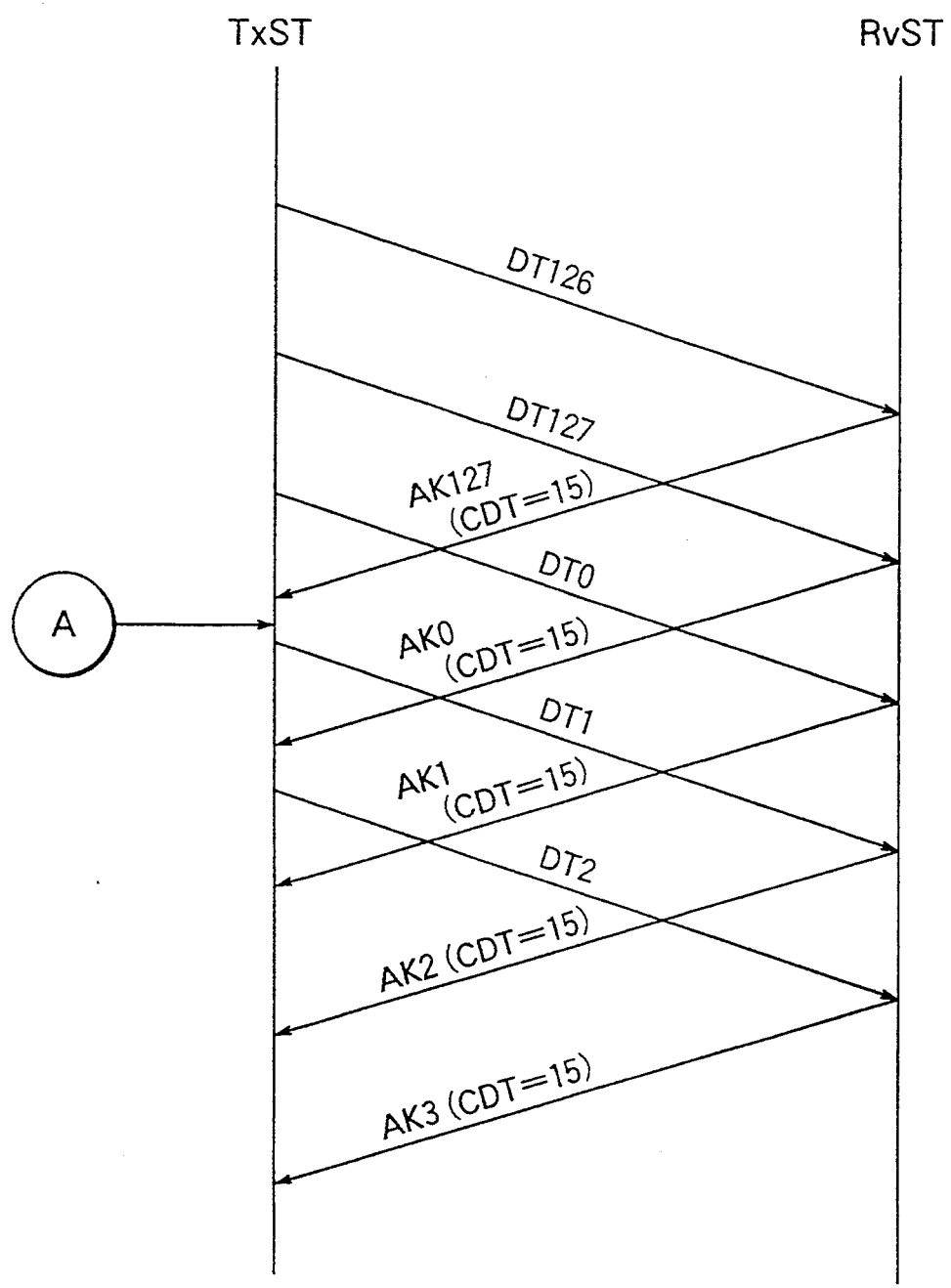
FIG. 3 is a diagram showing a data transfer sequence of the OSI Transport Layer Protocol, Class 4.

FIG. 3 is a diagram showing a data transfer protocol sequence of TP4. A data transmitting station TxST sequentially transmits data in the form of DT packets, each assigned a particular sequence number. Sequence numbers are assigned to DT packets in ascending order. After a predetermined maximum number, the sequence number resets to 0.

In TP4, if the sequence number has a general format represented by seven bits for example, it cyclically changes its value from a maximum 127 to a minimum 0.

Upon reception of a DT packet, a data receiving station RvST returns an AK packet to the transmitting station TxST. The AK packet contains the sequence number of a DT packet expected to be received next and the number of packets capable of being received in succession (hereinafter, this number of packets will be called a credit number CDT).

Upon reception of the AK packet from the receiving station RvST, the data transmitting station TxST can recognize that the data was correctly transmitted to the receiving station RvST. The data transmitting station TxST can successively transmit data (DT packets) falling within a predetermined range (hereinafter called a window), without waiting for reception of an AT packet. Examples of the formats of the DT and AK packets are shown in FIGS. 4A and 4B.

Figure 5:
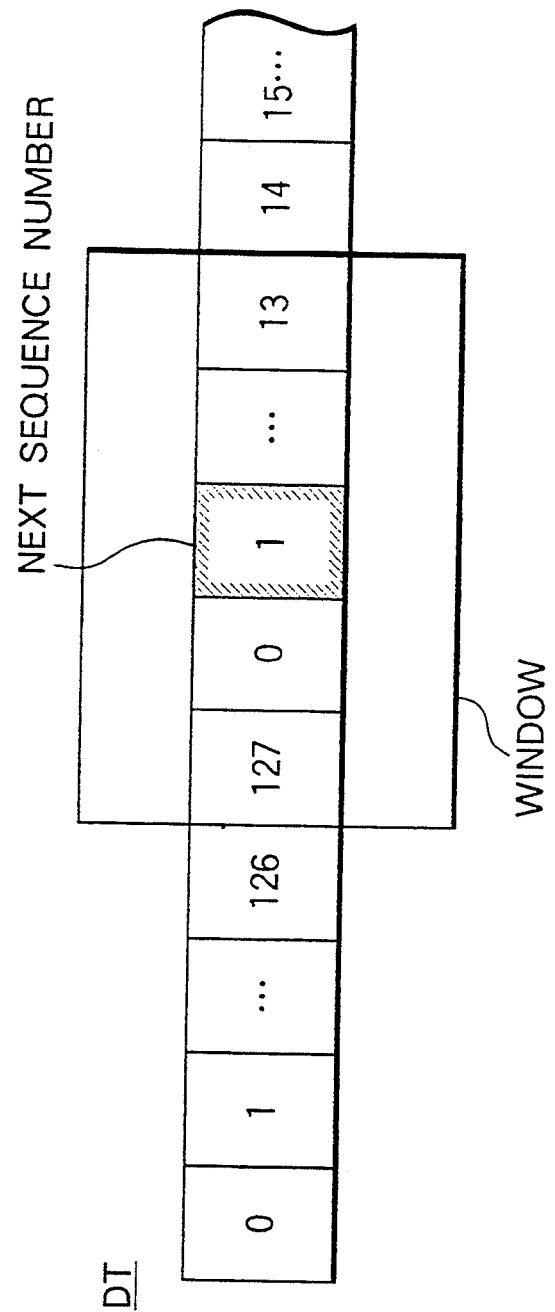
FIG. 5 is a diagram illustrating the concept of a window used for processing a communications protocol.

FIG. 5 is a schematic diagram showing a window at a time point A shown in FIG. 3. The transmitting station can recognize, from the contents of the packet AK 127 received just before the time point A, that the transmitted packets up to the packet DT126 were correctly received by the destination station, and can recognize, from the credit value CDT "15" informed by the received packet AK127, that packets up to the packet DT13 can be transmitted in succession without waiting for a new AK packet from the destination station.

Each time the transmitting station transmits a DT packet, the sequence number is updated, and each time the transmitting station receives an AK packet from the destination station, the window is slid. In this specification, such an operation is called a "window control process". In this embodiment, the window control process is executed using four parameters, including a transmission state variable VS, a window lower limit value LWE, a window upper limit value UWE and a credit value CDT.

The transmission state variable VS indicates the sequence number NR of a DT packet to be transmitted next. The window lower limit value LWE indicates the sequence number of a DT packet expected to be responded next, and is equal to the sequence number NR of the AK packet last received. The window upper limit value UWE indicates the maximum sequence number of a DT packet up to which DT packets can be transmitted in succession without waiting for reception of an AK packet, and is equal to the number of the window lower limit value LWE added to the credit value CDT. The credit value CDT indicates the number of DT packets which the destination station can receive, and is informed by the AK packet last received.

One of the objects of the present invention is to speed up the window control process.

Figure 6:
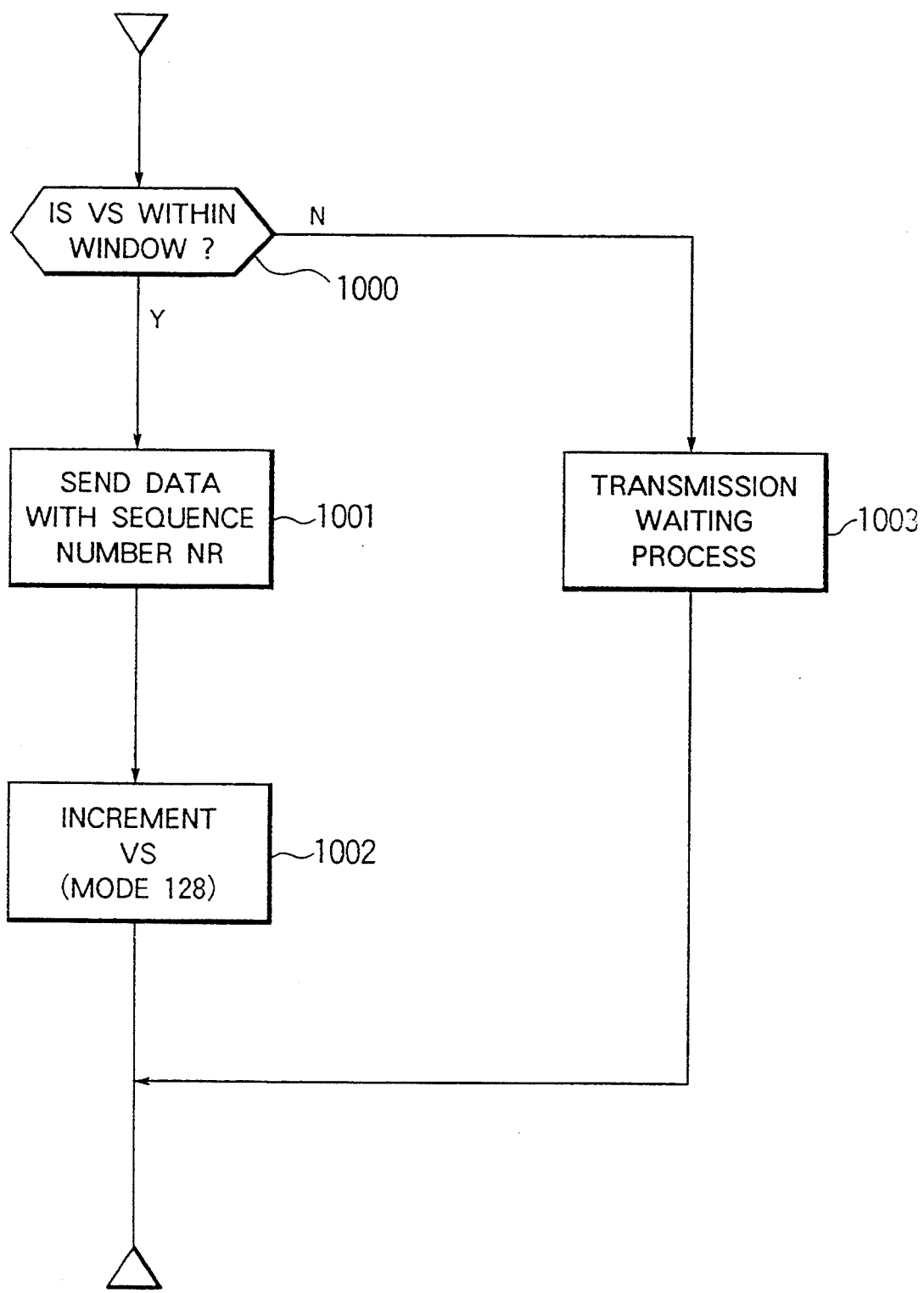
FIG. 6 is a flow chart showing the window control process to be executed when transmitting a DT packet.

FIG. 6 is a flow chart showing the window control process to be executed by the communication controller at the time of transmitting a DT packet.

When transmitting a DT packet, it is first judged whether the transmission state variable VS is within a predetermined range defined by the window lower and upper limit values LWE and UWE (step 1000). If the transmission state variable VS is within that range, it indicates a DT packet transmission ready state. After transmitting a DT packet of transmission data having the format shown in FIG. 4A and an assigned sequence number NR (step 1001), the transmission state variable VS is incremented by 1 to prepare the next transmission (step 1002). At this time, modulo operation is executed. Namely, if the transmission state variable VS incremented by 1 exceeds a predetermined maximum value, it is set to "0". If it is judged at the step 1000 that the transmission state variable VS is not within the predetermined range defined by the window lower and upper limit values LWE and UWS, it indicates a DT packet transmission inhibited state. Therefore, the data transmission is inhibited until a new AK packet is received (step 1003).

Figure 7:
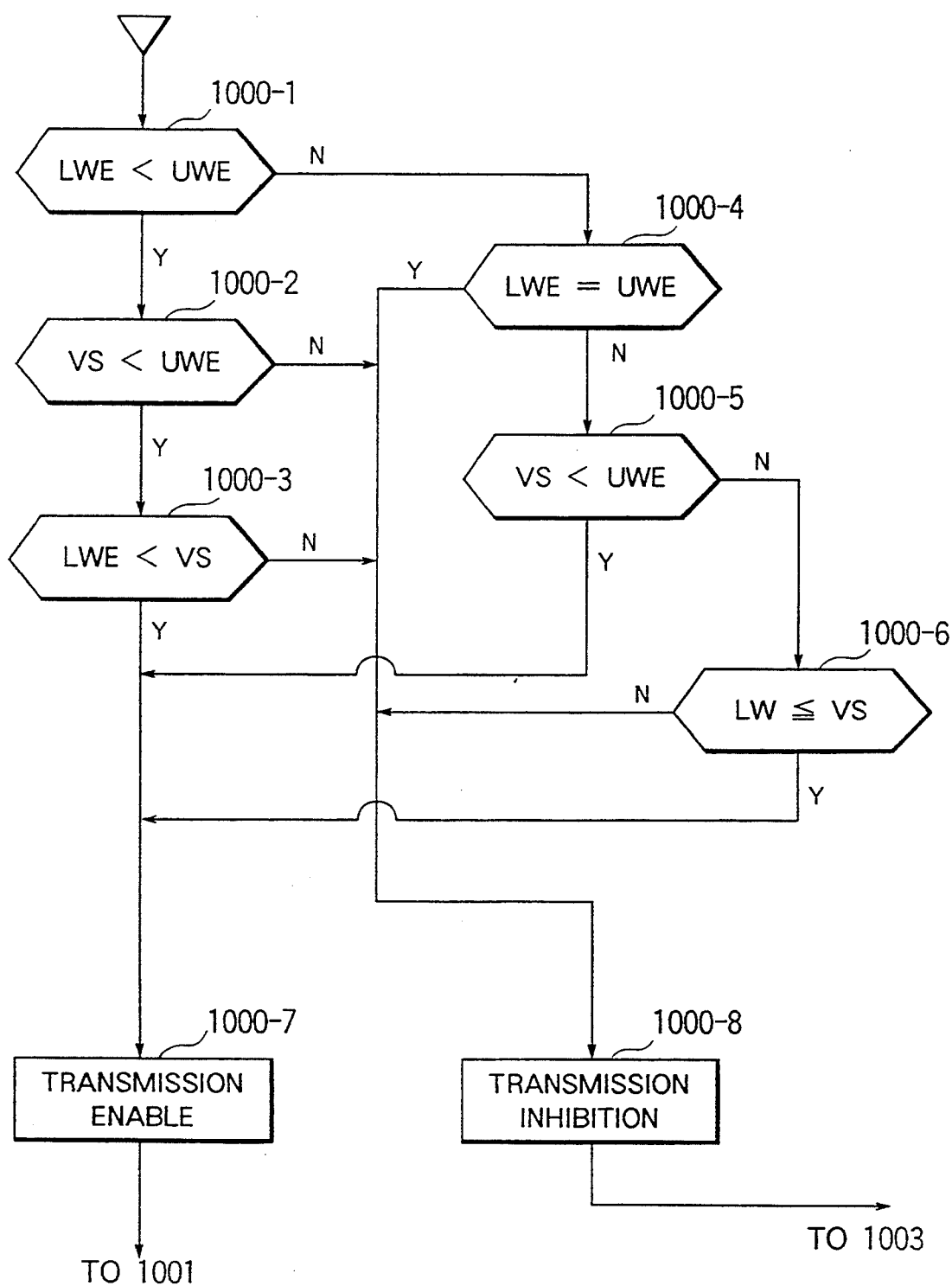
FIG. 7 is a detailed flow chart showing a transmission enabled/disabled judgment step of the window control process to be executed when transmitting a DT packet.

FIG. 7 is a detailed flow chart of the judgment process at the step 1000 shown in FIG. 6. This flow chart shows the judgment process by a conventional microprocessor having an embedded ALU with a two-input operation function, the judgment process judging whether a transmission state variable VS is between the window lower and upper limits values LWE and UWE.

As seen from FIG. 7, in judging whether the variable VS is between the lower and upper limit values LWE and UWE (three-input modulo comparison process), the conventional microprocessor requires a routine of six comparison judgment steps 1000-1 to 1000-6. This routine needs to execute a microprogram having a plurality of instructions.

Figure 8:
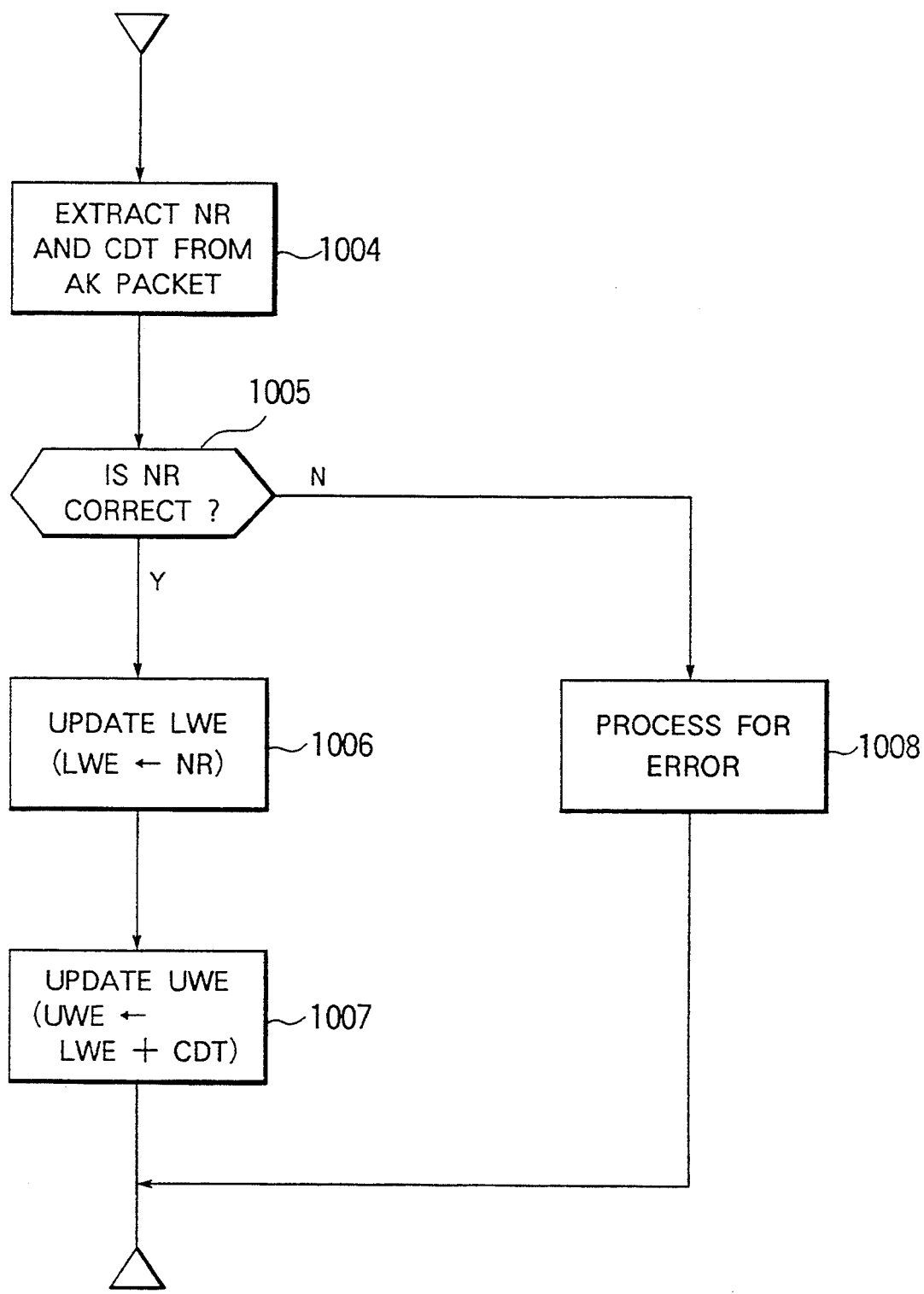
FIG. 8 is a flow chart of the window control process to be executed when receiving an AK packet.

FIG. 8 is a flow chart showing the window control process to be executed by the communication controller upon receiving an AK packet. When receiving an AK packet, the sequence number NR and credit value CDT are extracted from the received AK packet (step 1004), and thereafter, it is checked whether the sequence number NR is correct (step 1005). If the sequence number NR is not correct, an error process is executed (step 1008). If correct, the sequence number NR is used as a new window lower limit value LWU (step 1006), and the new window lower limit value LWU added to the credit value CDT is used as a new window upper limit value UWE (step 1007). At this time, modulo operation is executed.

Figure 9:
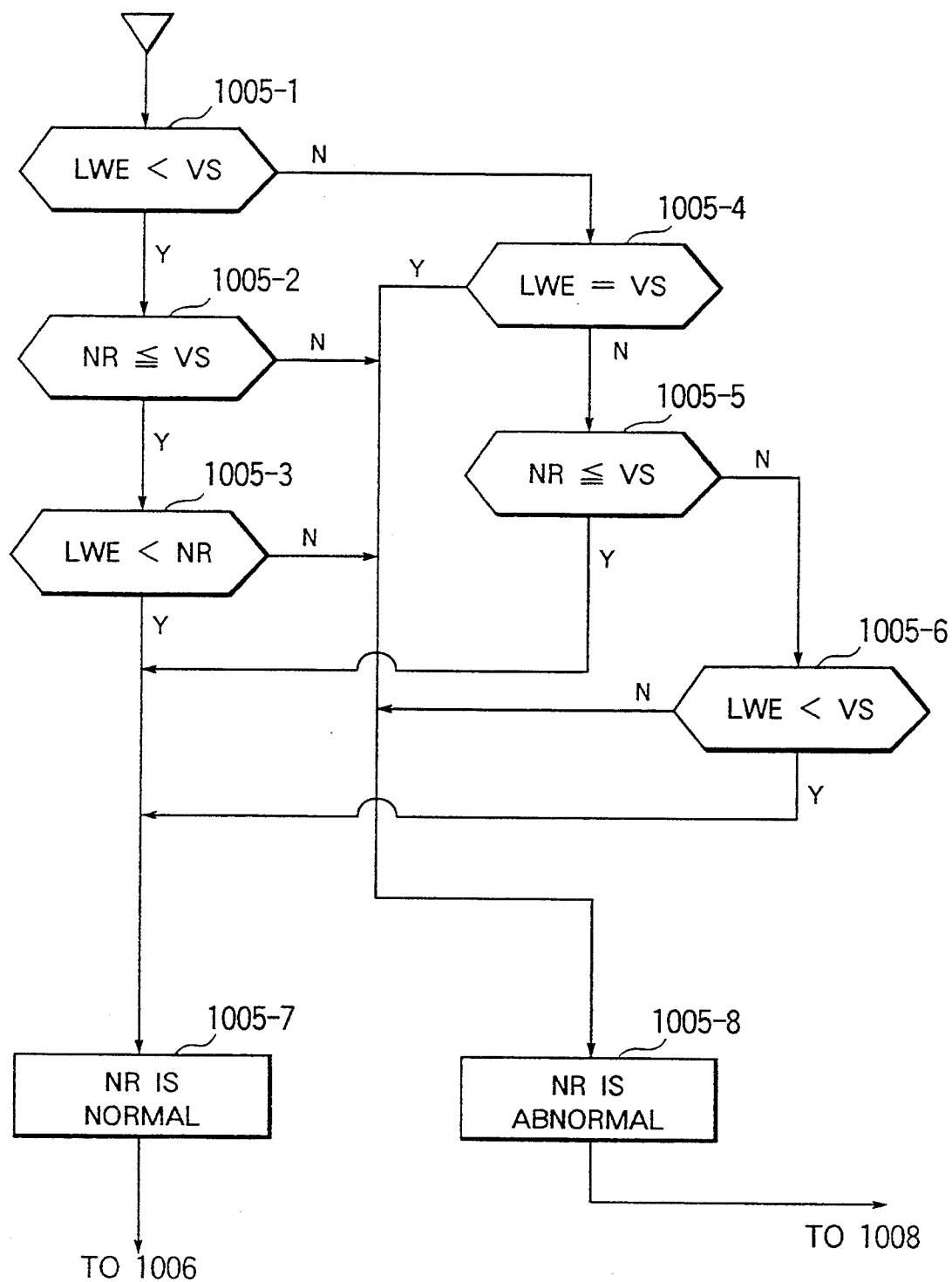
FIG. 9 is a flow chart showing a sequence number validity check step of the window control process to be executed when receiving an AK packet.

FIG. 9 is a detailed flow chart showing the AK packet sequence number NR check operation by a conventional microprocessor having an embedded ALU with a two-input operation function (two-input ALU).

As seen from this flow chart, the conventional microprocessor requires six comparison judgment steps 1005-1 to 1005-6 for the modulo-based sequence number NR judgment process. Similar to the above-described transmission state variable judgment, it is necessary to execute a microprogram having a plurality of instructions.

Figure 10:
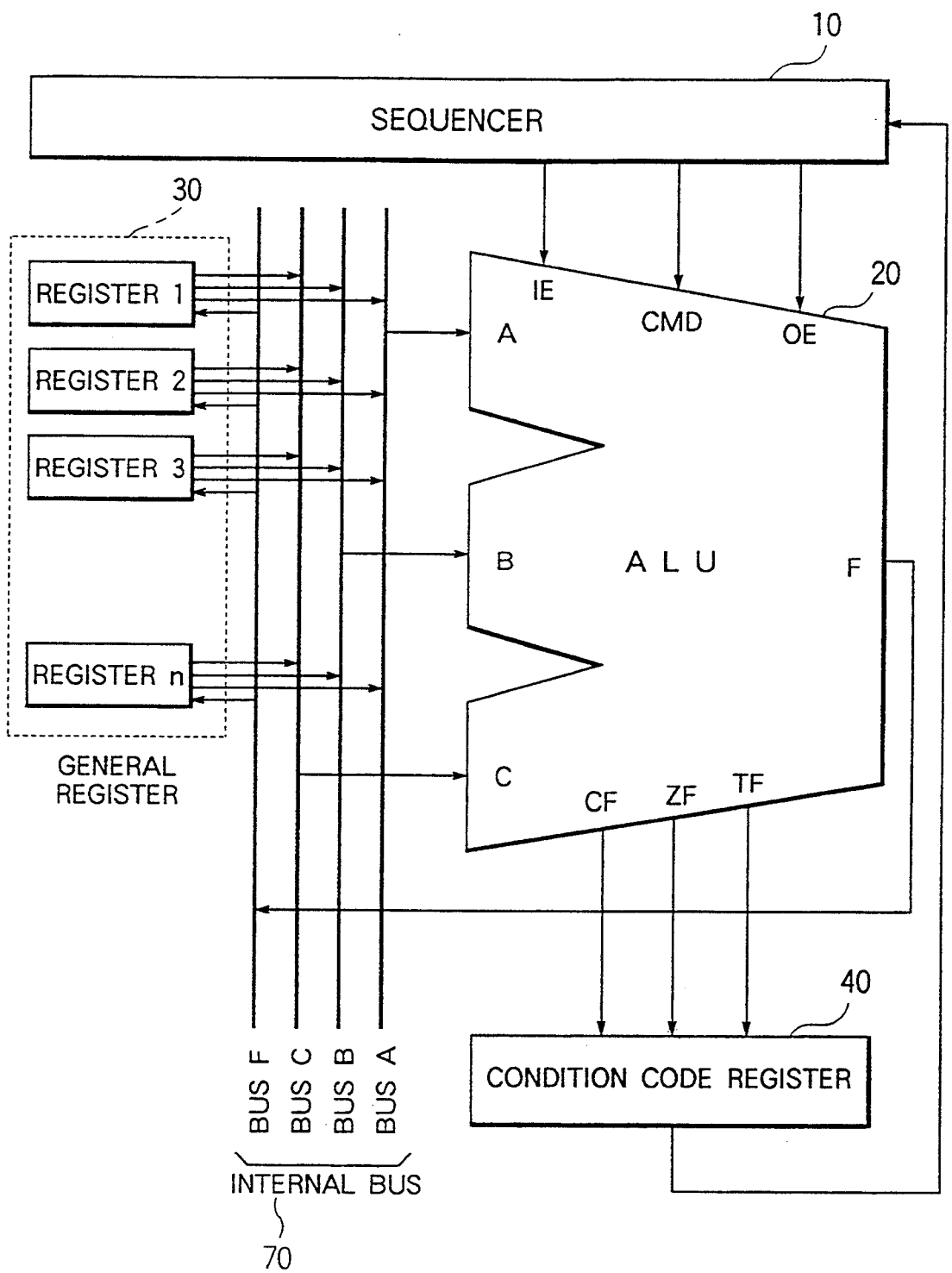
FIG. 10 is a connection block diagram of ALU 20 constituting the microprocessor shown in FIG. 1.

FIG. 10 is a connection block diagram of the ALU 20 of the present invention. ALU 20 has a three-input modulo operation function in addition to a conventional two-input operation function, for allowing a high speed window control process.

ALU 20 is provided with three data input ports A, B and C, one data output port F, an input enable signal line IE, inputs lines for an operation command CMD and output enable signal OE, and output lines for a carry output flag CF, a zero output flag ZF and comparison judgment flag TF.

In this embodiment, the data input ports A, B and C and data output port F are connected to four independent internal data busses 70 (bus A, bus B, bus C and bus F). The operation command CMD, input enable signal IE and output enable signal OE are supplied from the sequencer 10. The carry output flag CF, zero output flag ZF and comparison judgment flag TF are input via the condition code registers 40 to the sequencer 10.

Next, a description will be given for an operation by the sequencer 10 of activating ALU 20, according to the embodiment.

FIGS. 11A and 11B show examples of the formats of macro instructions for the window control process to be executed by the sequencer 10.

In this embodiment, as the window control process instruction, there are prepared three types of instructions, including a modulo addition instruction MADD, a modulo subtraction instruction MSUB and a three-input modulo comparison instruction MCMPn. The modulo addition and subtraction instructions MADD and MSUB are used for updating the sequence number and window for example. The three-input comparison instruction MCMPn is a single instruction for a window check at the time of transmitting a DT packet (process at the step 1000 shown in FIG. 6) or a validity check at the time of receiving an AK packet (process at the step 1005 shown in FIG. 8).

In this embodiment, such a macro instruction processes data stored in some of the general registers 30 within the microprocessor 1.

As shown in FIG. 11A, the modulo addition/subtraction instruction (modulo addition instruction MADD or modulo subtraction instruction MSUB) is constructed of an INST field for storing an instruction code representative of the type of operation, S1 and S2 fields for storing the numbers of two registers storing two operation data, a MOD field for storing the number of a register storing mask data necessary for modulo operation, and a DST field for storing the number of a resister which stores the operation results.

The value of the register number stored in the MOD field takes one of the values from "0" to "$2^n-1$" in this embodiment.

As shown in FIG. 11B, the three-input comparison instruction MCMPn is constructed of an instruction code INST field, S1, S2 and S3 fields for storing the numbers of registers storing comparison data, and an ADR field for storing a jump address of an instruction to be executed next if the comparison results do not meet the conditions.

In the embodiment, as the three-input comparison instruction MCMPn, the following four instructions are provided by way of example to allow flexible setting of boundary values:

MCMP1 instruction for judging whether a relation $S1 \leq S2 \leq S3$ is satisfied;

MCMP2 instruction for judging whether a relation $S1 \leq S2 < S3$ is satisfied;

MCMP3 instruction for judging whether a relation $S1 < S2 \leq S3$ is satisfied; and MCMP4 instruction for judging whether a relation $S1 < S2 < S3$ is satisfied. These judgment instructions are used not for comparing three values, but for judging whether a parameter value is within a range defined by the window upper and lower limit values.

Next, the control operation of the sequencer 10 to execute an instruction will be described with reference to the flow charts shown in FIGS. 12 to 14.

Figure 12:
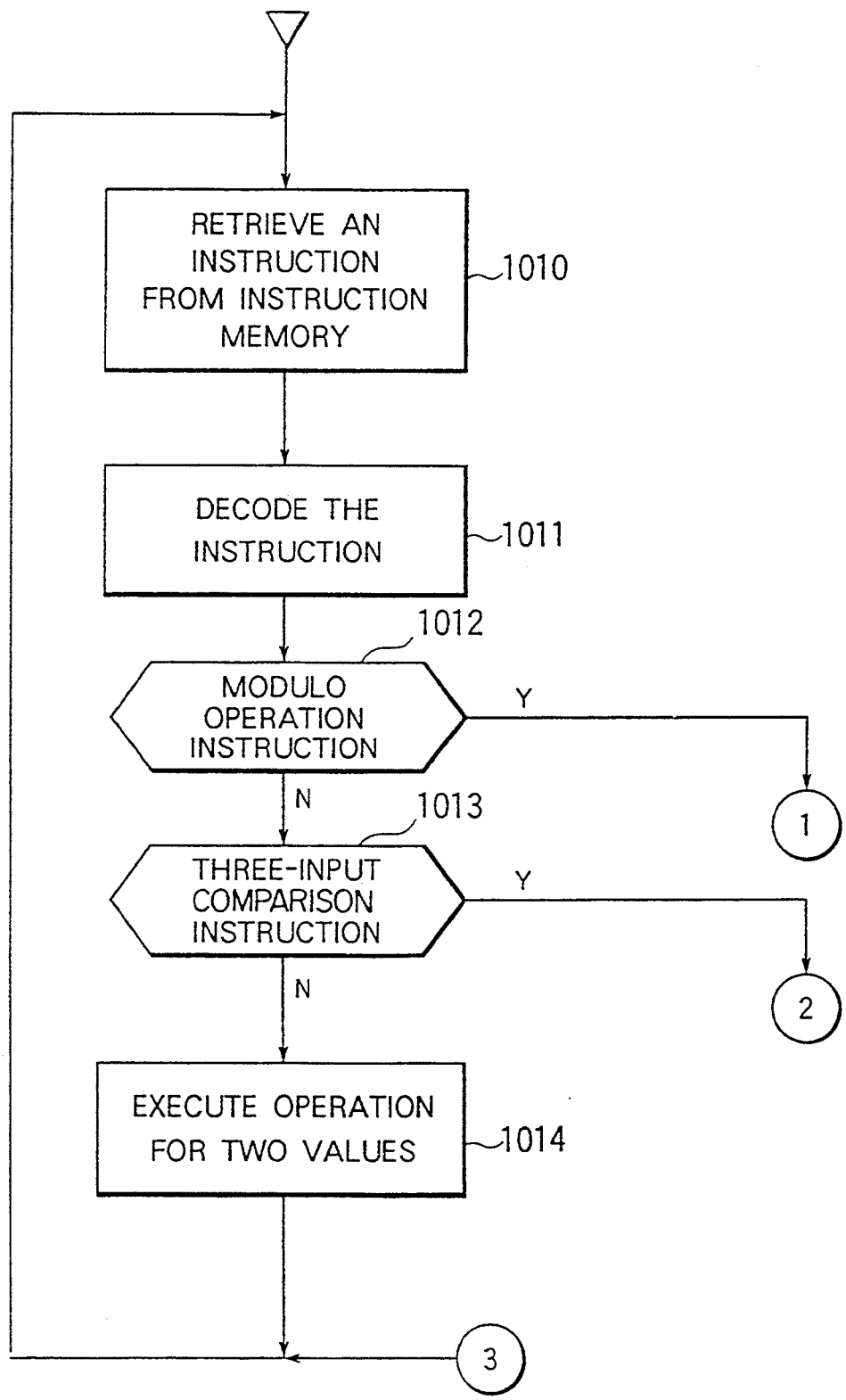
FIG. 12 is a flow chart showing the main part of the control operation to be executed by the sequencer 10 of the microprocessor.

Referring to FIG. 12, the sequencer 10 retrieves an instruction to be executed, from the instruction memory 2 (step 1010), and decodes its instruction code INST field (step 1011).

Figure 13:
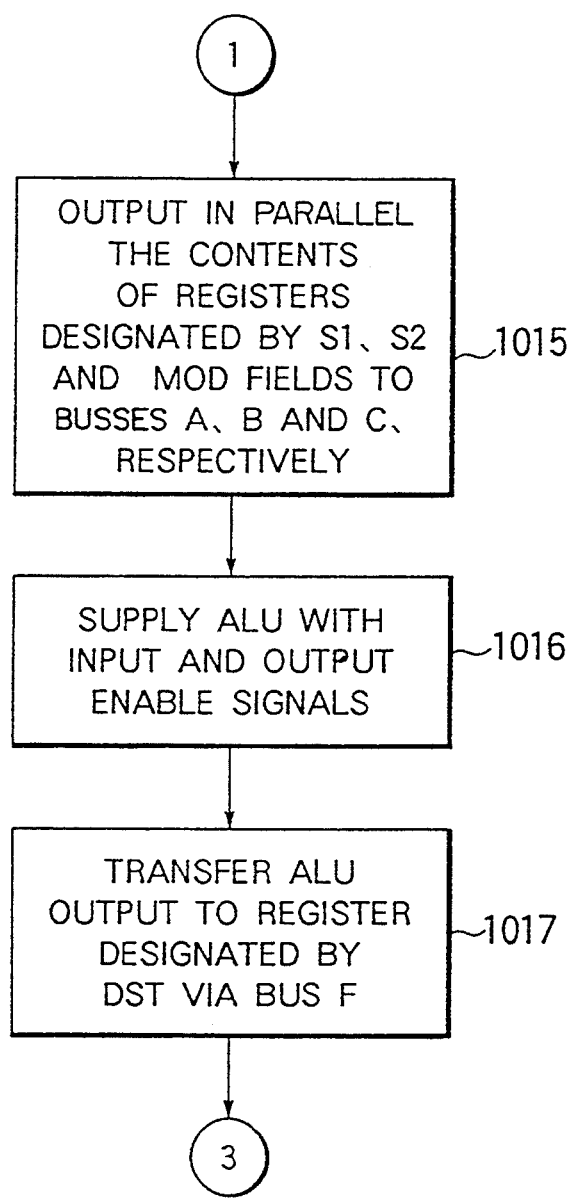
FIG. 13 is a flow chart showing the control operation of the sequencer 10 when executing a modulo addition/subtraction operation.

If the retrieved instruction is a modulo addition instruction MADD or modulo subtraction instruction MSUB, the contents of the registers designated by the fields S1, S2 and S3 are output in parallel to the busses A, B and C, respectively (step 1015) shown in FIG. 13. The input enable signal IE, output enable signal OE and operation command CMD are supplied to ALU 20 (step 1016). Next, the operation results output from ALU 20 are transferred via the bus F to the registers designated by the DST field (step 1017).

Figure 14:
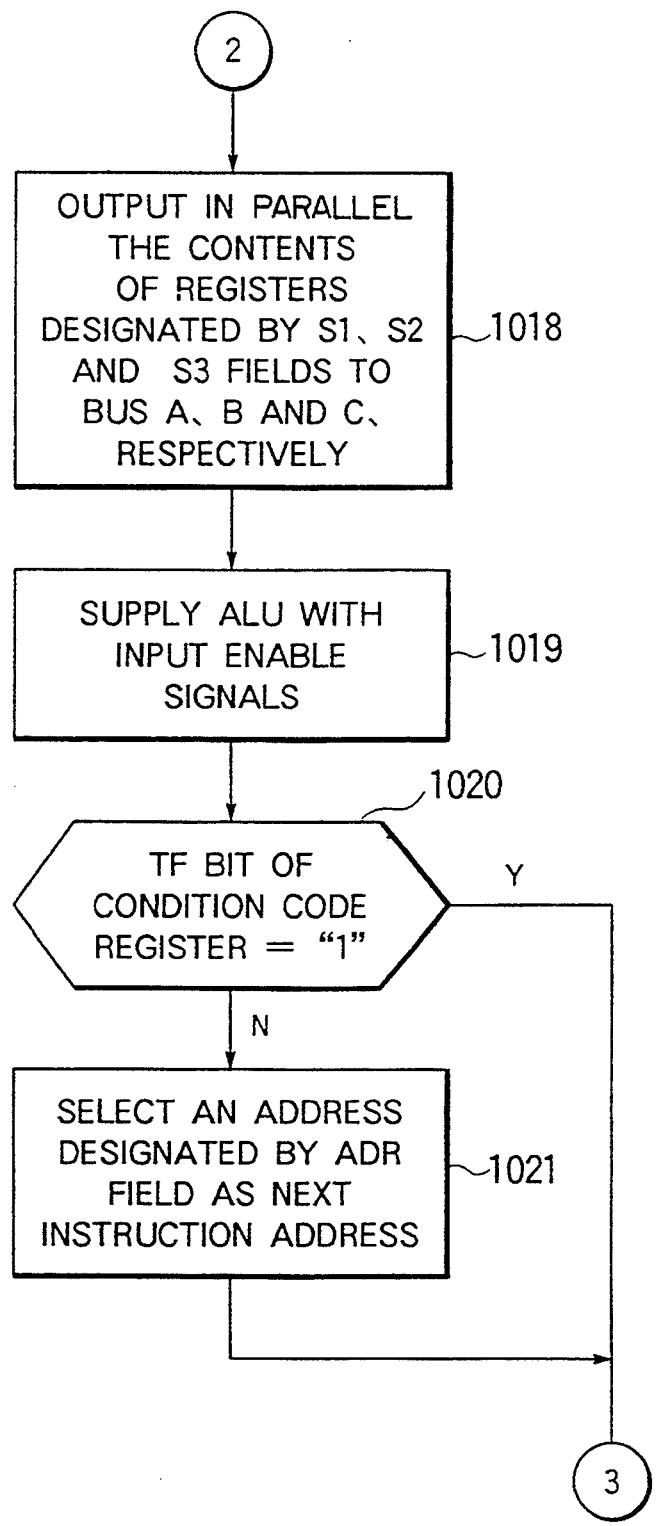
FIG. 14 is a flow chart showing the control operation of the sequencer 10 when executing a three-input comparison operation.

If the retrieved instruction is a three-input comparison instruction MCMPn, the contents of the registers designated by the S1, S2 and S3 fields are output in parallel to the busses A, B and C, respectively (step 1018) shown in FIG. 14. The input enable signal IE and operation command CMD are supplied to ALU 20 (step 1019). Next, the state of the judgment flag TF representing the three-input comparison results of ALU 20 is fetched from the condition code register 40 to check the comparison results (step 1020).

In this case, if the judgment flag TF bit is "1", an instruction immediately after the presently executed instruction is used as an instruction to be executed next, and if not "1", an instruction at the address designated by the ADR field is used as an instruction to be executed next (step 1021).

If in the flow chart shown in FIG. 12, the command is none of the modulo addition and subtraction instructions MADD and MSUB and three-input comparison instruction MCMPn, a two-input operation is executed (step 1014).

Figure 15:
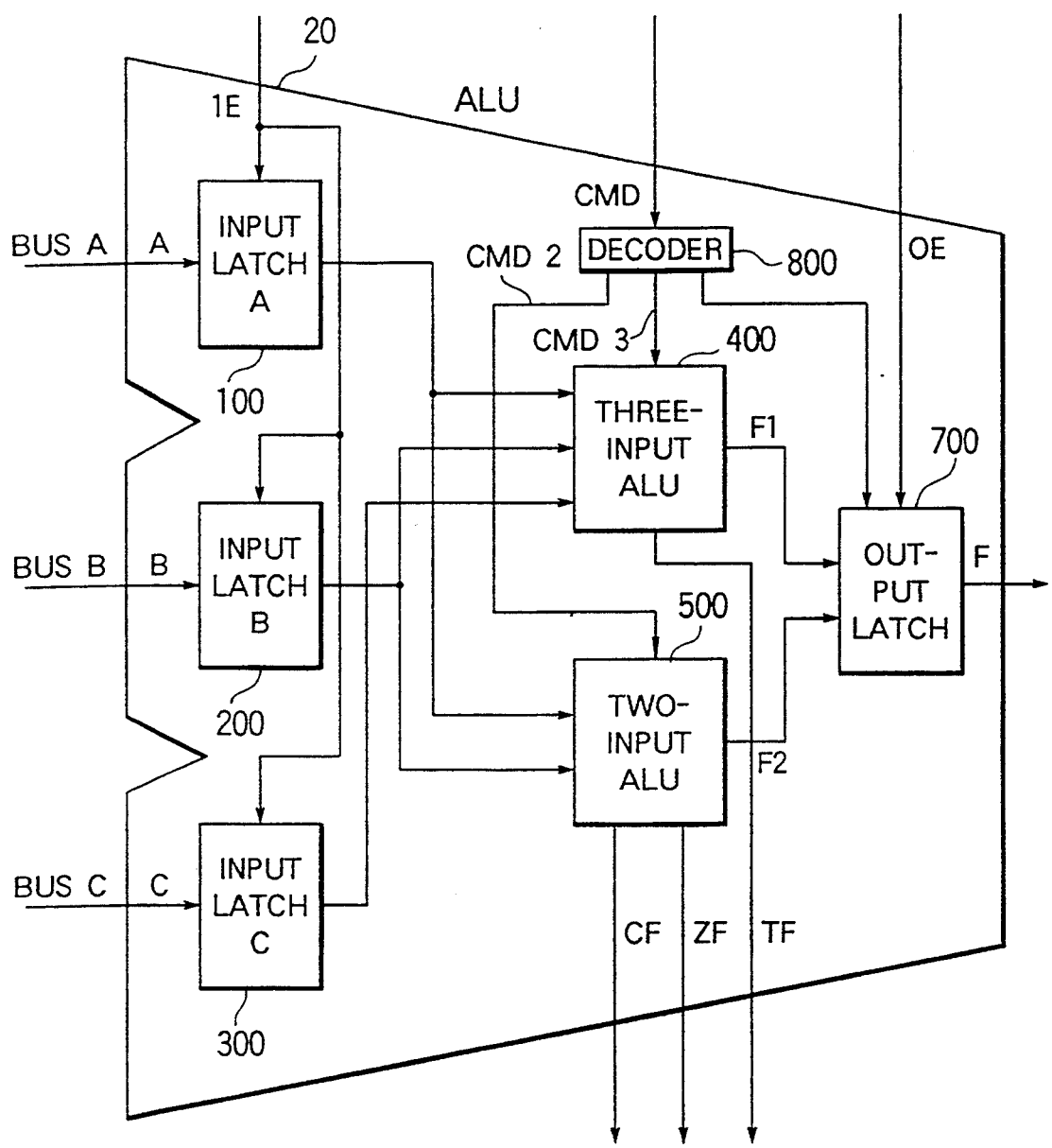
FIG. 15 is a block diagram showing an embodiment of ALU 20.

The internal structure of ALU 20 will be described with reference to FIG. 15.

ALU 20 is constructed of a first input latch A 100, a second input latch B 200, a third input latch C 300, an instruction decoder 800, a three-input ALU 400, a two-input ALU 500 and an output latch 700.

The first input latch A 100, second input latch B 200 and third input latch C 300 latch the data on the busses A, B and C, respectively connected to ALU 20, in response to the input enable signal IE from the sequencer 10.

The instruction decoder 800 decodes an operation command CMD from the sequencer 10, and outputs a control signal CMD3 if the operation command is a modulo addition/subtraction instruction (MADD/MSUB) or three-input comparison instruction (MCMPn), or a control signal CMD2 if it is a two-input operation command.

The three-input ALU 400 responds to the control signal CMD3 from the instruction decoder 800, and executes an operation using three data in the first to third input latches.

The two-input ALU 500 responds to the control signal CMD2, and executes an operation using two data in the first and second input latches.

The output latch 700 responds to the output enable signal OE from the sequencer 10 and an output from the decoder 800, and selectively outputs the data from the three-input ALU 400 or two-input ALU 500 to a data output port F.

Figure 16:
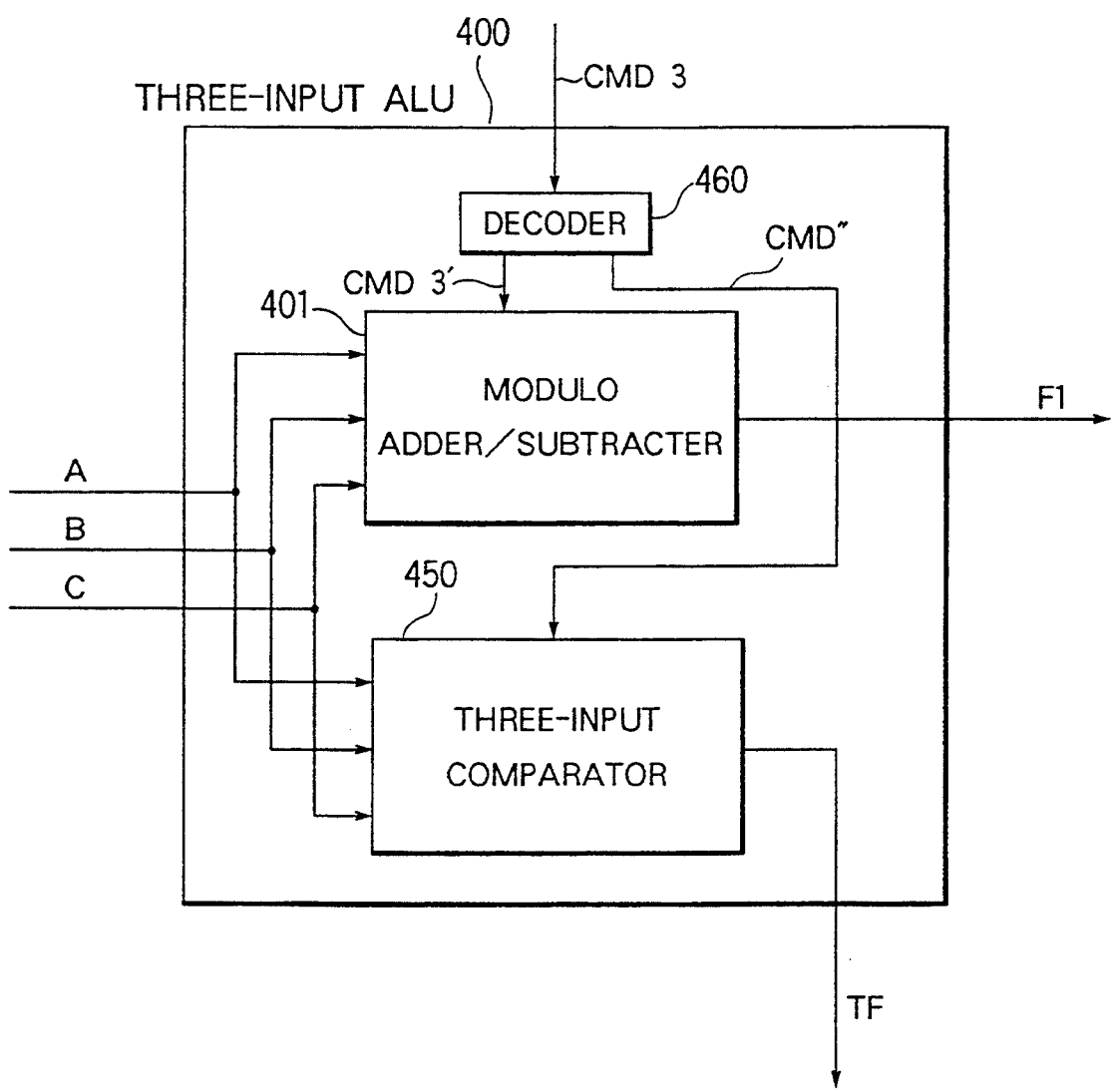
FIG. 16 is a block diagram showing an embodiment of the three-input comparator 400 constituting ALU 20.

The three-input ALU 400 is constructed, for example as shown in FIG. 16, of a modulo adder-subtracter 401, a three-input comparator 450, and an instruction decoder 460. This instruction decoder 460 supplies activation instructions CMD3' and CMD3" to the modulo adder/subtracter 401 and three-input comparator 450, respectively, in accordance with the contents of the operation command CMD3 output from the decoder 800 shown in FIG. 15.

The modulo adder/subtracter 401 receives data latched at a port A (input latch A) and port B (input latch B) as addition/subtraction data, and data latched at a port C (input latch C) as mask data for modulo operation, the operation results F1 being output to the output latch 700.

The three-input comparator 450 receives data latched at the ports A and B as the window upper and lower limit values, and data latched at the port B as the data to be judged. The comparator 450 judges whether the data received at the port B is within the range defined by the window upper and lower limit values, and outputs the judgment results as the TF bit.

Figure 17:
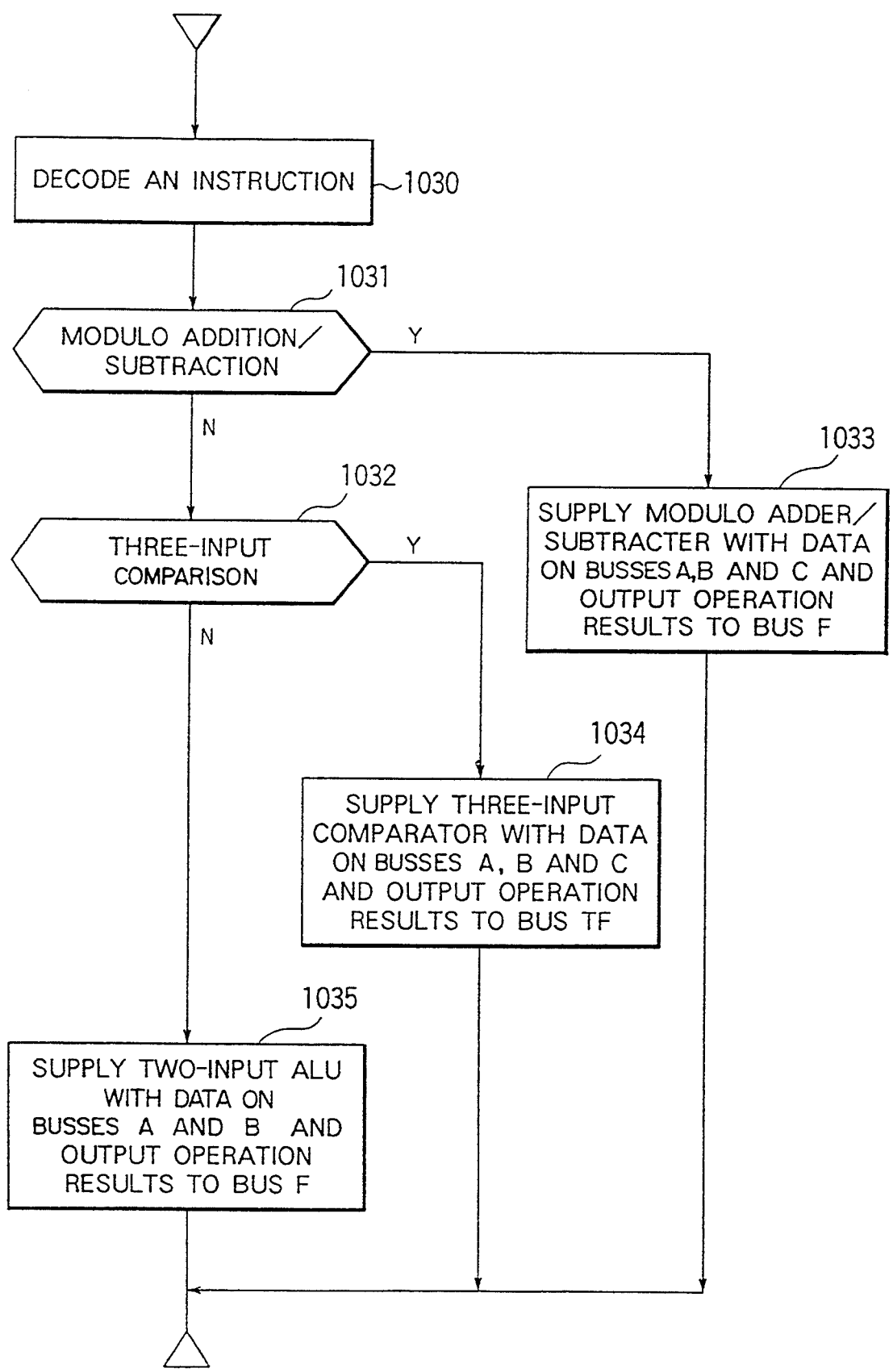
FIG. 17 is a flow chart showing the operation of ALU 20.

FIG. 17 is a flow chart showing the internal operation of ALU 20.

ALU 20 first decodes an operation command CMD supplied from the sequencer 10 (step 1030).

If the operation command is a modulo addition/subtraction instruction (MADD/MSUB), the modulo adder/subtracter 401 in the three-input ALU 400 starts operating upon reception of the control signal CMD' from the decoder 401, and receives data on the busses A, B and C latched by the input latches 100, 200 and 300, the operation results being output to the bus F via the output latch 700 (step 1033).

If the operation command is a three-input comparison instruction MCMPn, the three-input comparator 450 in the three-input ALU 400 starts operating upon reception of the control signal CMD" from the decoder 460, and receives data on the busses A, B and C, the comparison results being output as the TF bit (step 1034).

If the operation command is none of the modulo addition/subtraction instruction and three-input comparison instruction, the two-input ALU starts operating upon reception of the control signal CMD2 from the decoder 800, and receives data on the A and B, the operation results being output to the bus F. If a carry generates during this operation, the CF bit is output, and if the operation results indicate "0", the ZF bit is output (step 1035).

Figure 18:
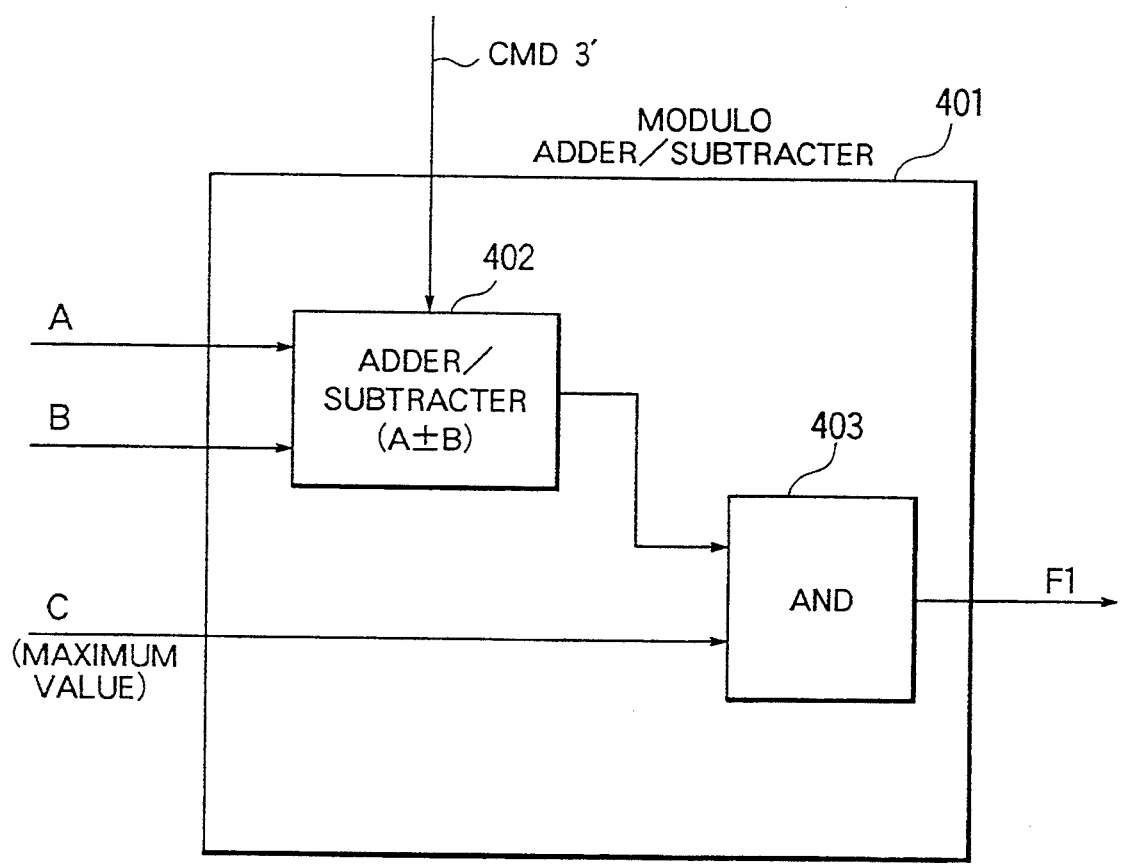
FIG. 18 is a block diagram showing an embodiment of the modulo adder/subtracter 401 constituting the three-input ALU 400.

FIG. 18 shows the structure of the modulo adder/subtracter 401.

The modulo adder/subtracter 401 is constructed of an adder/subtracter 402 and an AND gate 403, this combination performing modulo addition/subtraction. The adder/subtracter 402 performs either an addition operation or subtraction operation of two data input from the ports A and B. The AND gate 403 obtains a logical multiplication of the outputs from the adder/subtracter 402 and from the port C for each bit. For example, in the case of modulo 128, the operation results to be output are $127+2=1$, $1-127=2$, and so on.

Figure 19:
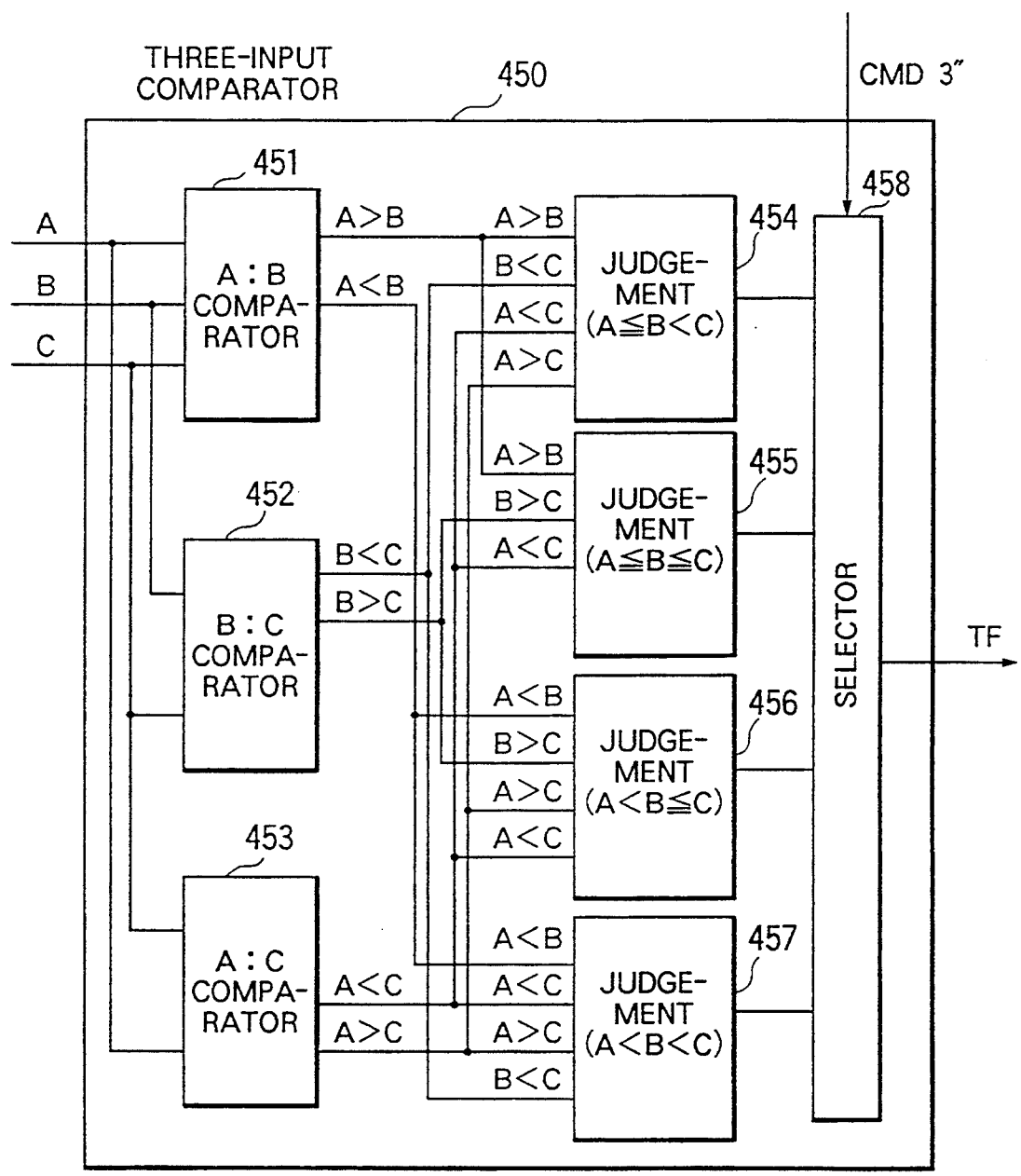
FIG. 19 is a block diagram showing an embodiment of the three-input comparator 450 constituting the three-input ALU 400.

FIG. 19 shows the structure of the three-input comparator 450.

The three-input comparator 450 is constructed of an A:B comparator 451, a B:C comparator 452, an A:C comparator 453, an $A \leq B < C$ judgment circuit 454, an $A \leq B \leq C$ judgment circuit 455, an $A < B \leq C$ judgment circuit 456, an $A < B < C$ judgment circuit 457, and a selector 458.

The A:B comparator 451 compares input data from the ports A and B. The B:C comparator 452 compares input data from the ports B and C. The A:C comparator 453 compares input data from the ports A and C. In accordance with the comparison results by the comparators 451 to 453, the four judgment circuits 454 to 457 judge whether the data B is within the range defined by the window lower and upper limits values A and C. The selector 458 selects the judgment results for the operation command CMD (control signal CMD3"), from the judgment results by the judgment circuits 454 to 457, and outputs them as the TF bit.

For example, for the TP4 communications protocol, a judgment $A \leq B < C$ is made during the window control process at the time of transmitting a DT packet, and a judgment $A < B \leq C$ is made during the window control process at the time of receiving an AK packet.

In this embodiment, in addition to such a judgment function, the $A \leq B \leq C$ and $A < B < C$ judgment circuits are prepared to allow flexible dealing with various requirements for judgment conditions at boundary points (equal values).

FIG. 20 is a table showing a relation between input conditions and output signals of the A:B, B:C and A:C comparators 451, 452 and 453.

Figure 21:
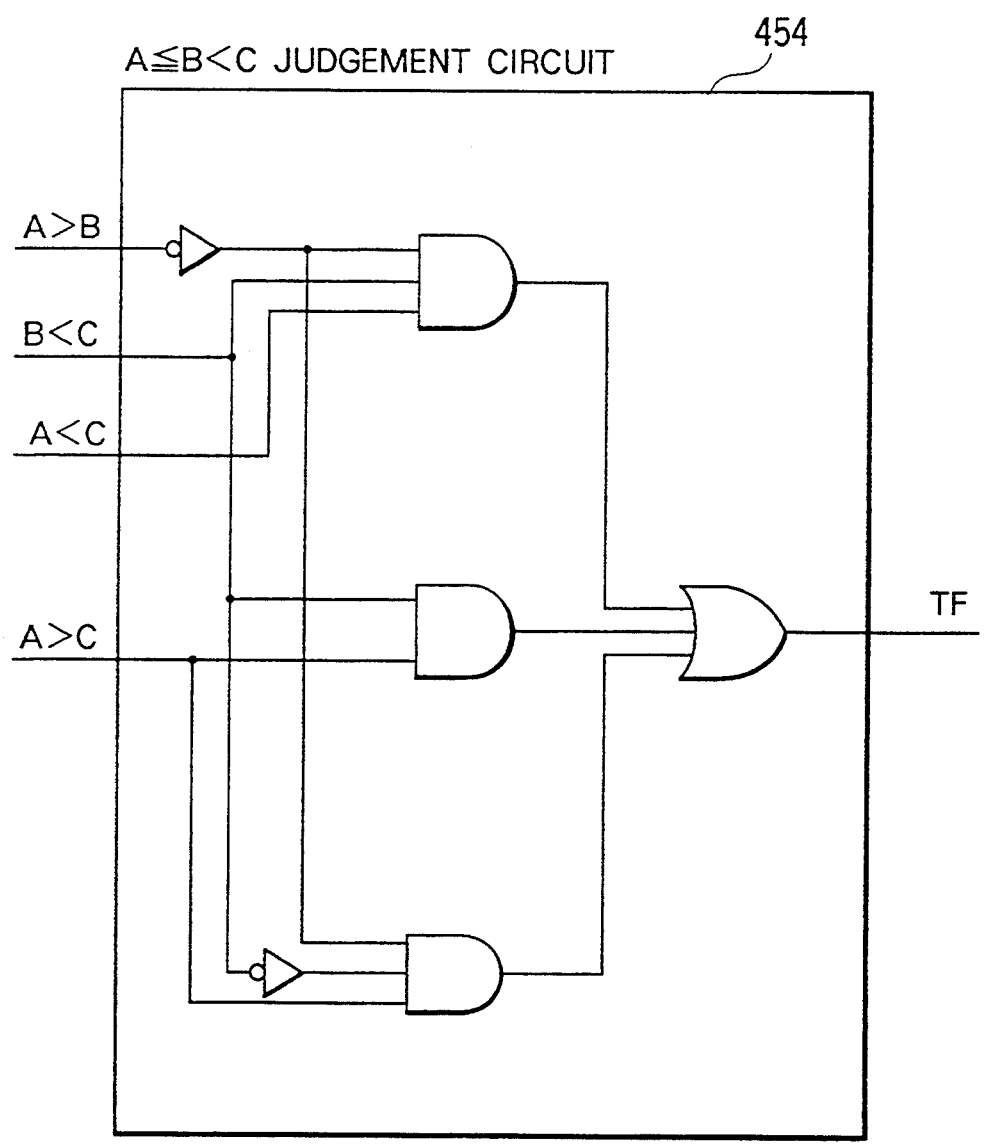
FIG. 21 s a circuit diagram showing an embodiment of the $A \leqq B < C$ judgment circuit 454 constituting the three-input comparator 450.

FIG. 21 shows an example of the circuit structure of the $A \leq B < C$ judgment circuit 454, and FIG. 22 is a table showing a relationship between input signals and output signal.

Figure 23:
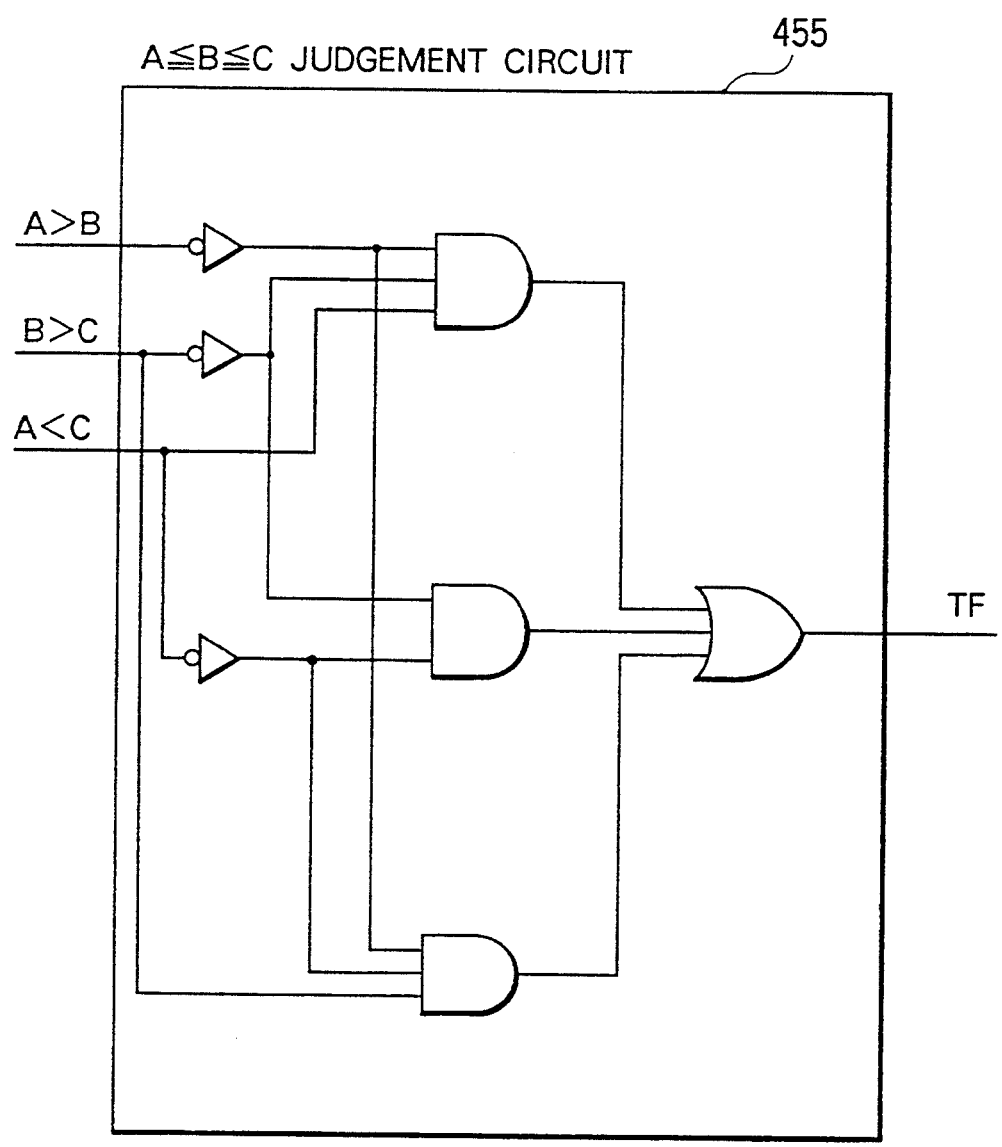
FIG. 23 is a circuit diagram showing an embodiment of the $A \leqq B \leqq C$ judgment circuit 455 constituting the three-input comparator 450.

FIG. 23 shows an example of the circuit structure of the $A \leq B \leq C$ judgment circuit 455, and FIG. 24 is a table showing a relation between input signals and output signal.

Figure 25:
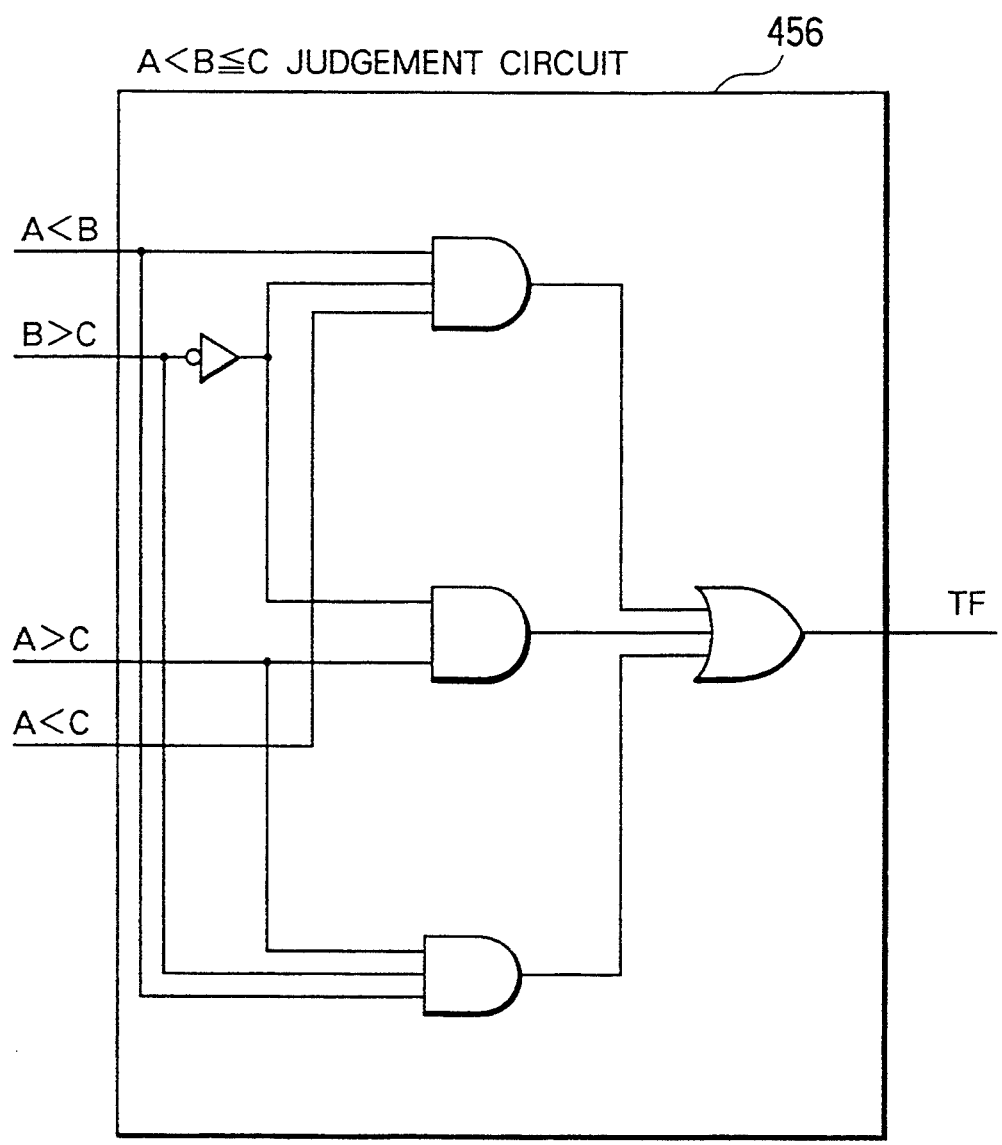
FIG. 25 is a circuit diagram showing an embodiment of the $A < B \leqq C$ judgment circuit 456 constituting the three-input comparator 450.

FIG. 25 shows an example of the circuit structure of the $A < B \leq C$ judgment circuit 456, and FIG. 26 is a table showing a relation between input signals and output signal.

Figure 27:
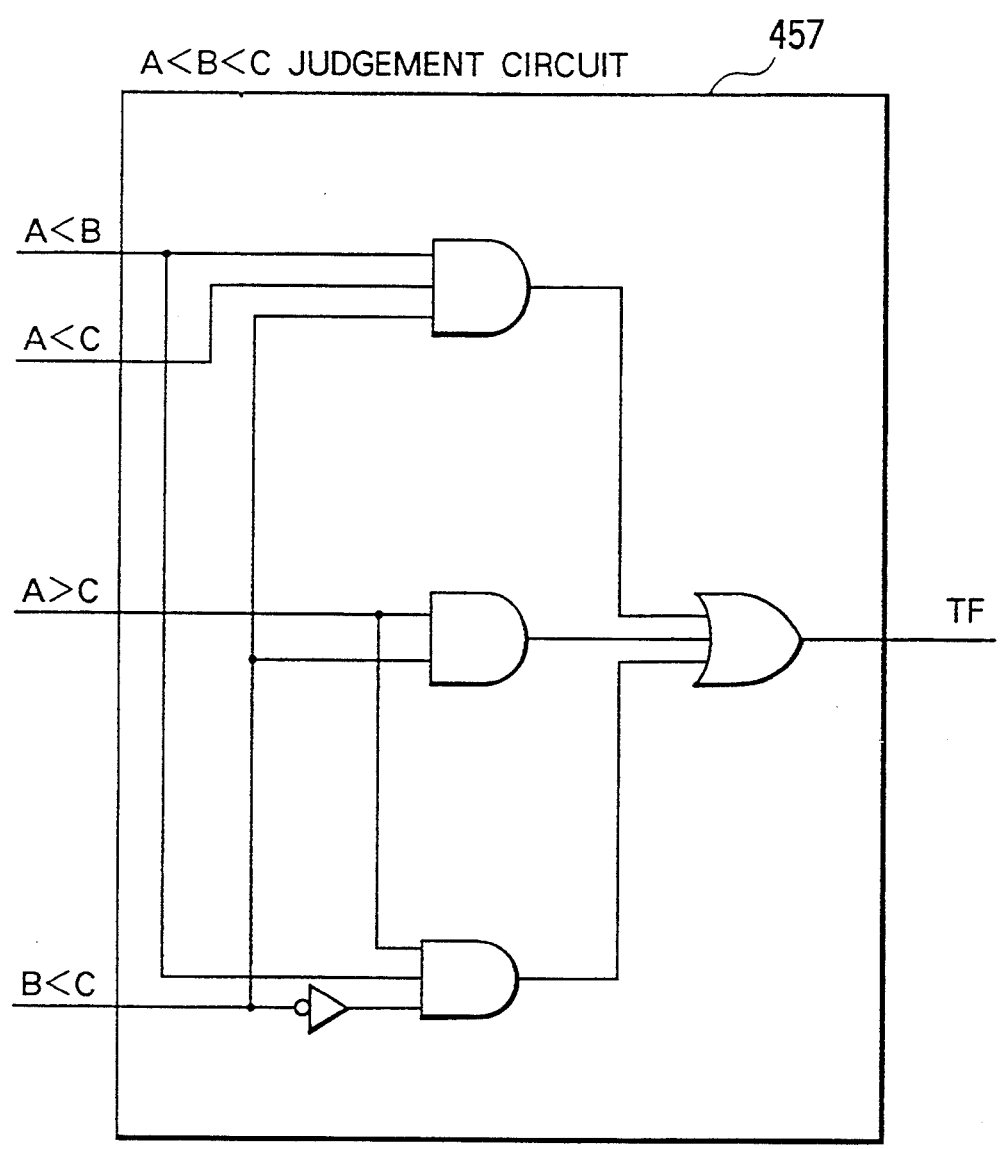
FIG. 27 is a circuit diagram showing an embodiment of the $A < B < C$ judgment circuit 457 constituting the three-input comparator 450.

FIG. 27 shows an example of the circuit structure of the $A < B < C$ judgment circuit 457, and FIG. 28 is a table showing a relation between input signals and output signal.

FIGS. 29A to 29E are timing charts of the operation by ALU 20 of the embodiment, showing timings of data inputs to the ports A, B and C, ALU operation and operation result output.

Figure 29:
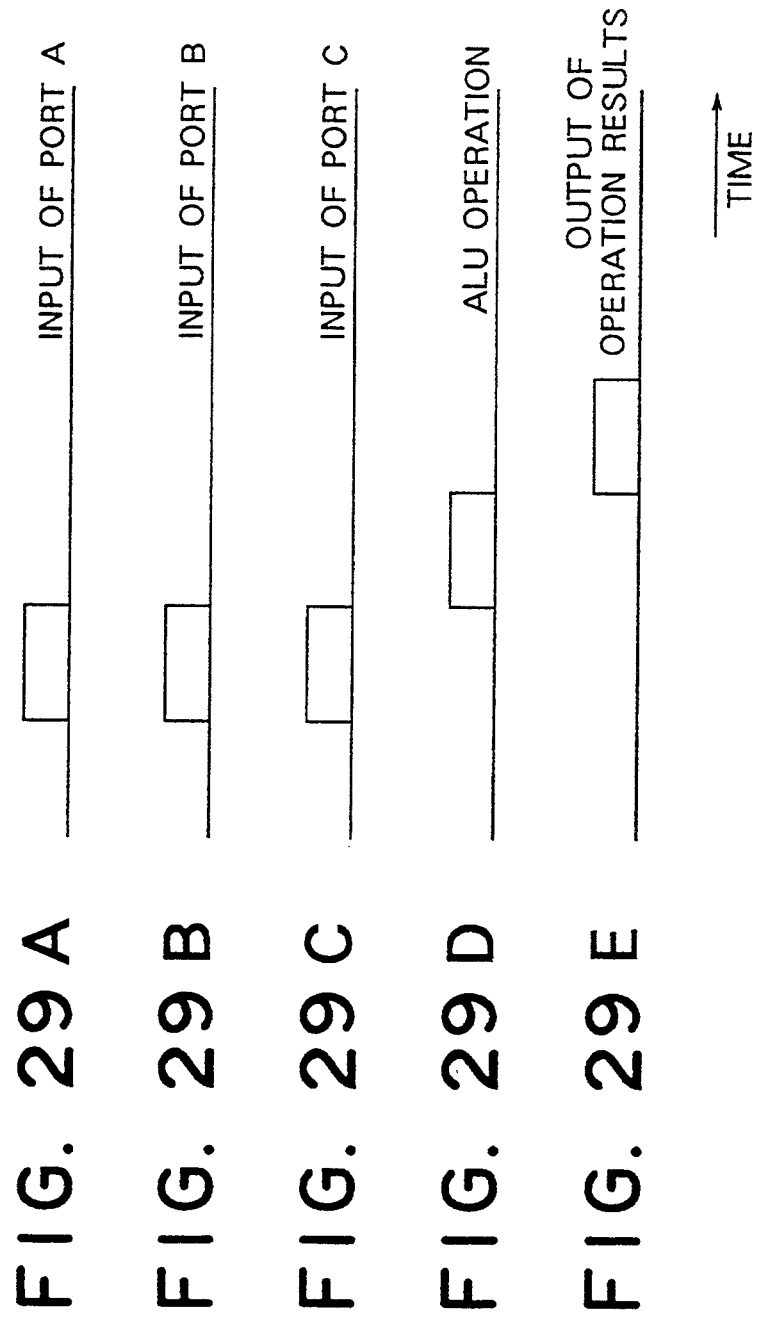
FIGS. 29A to 29E are timing charts showing the operation of ALU 20.

According to the above-described embodiment, ALU 20 has hardware for modulo addition, subtraction and three-input comparison operations, as well as conventional two-input operation. Therefore, the window control process necessary for the communication controller can be performed using simple instruction sets. Furthermore, a plurality of independent internal data busses 70 are provided within the microprocessor 1, and a plurality of data necessary for operation are supplied in parallel to ALU as shown in FIGS. 29A to 29C. Therefore, the time period necessary for a ready state of instruction execution can be shortened, providing the operation results quickly.

Figure 30:
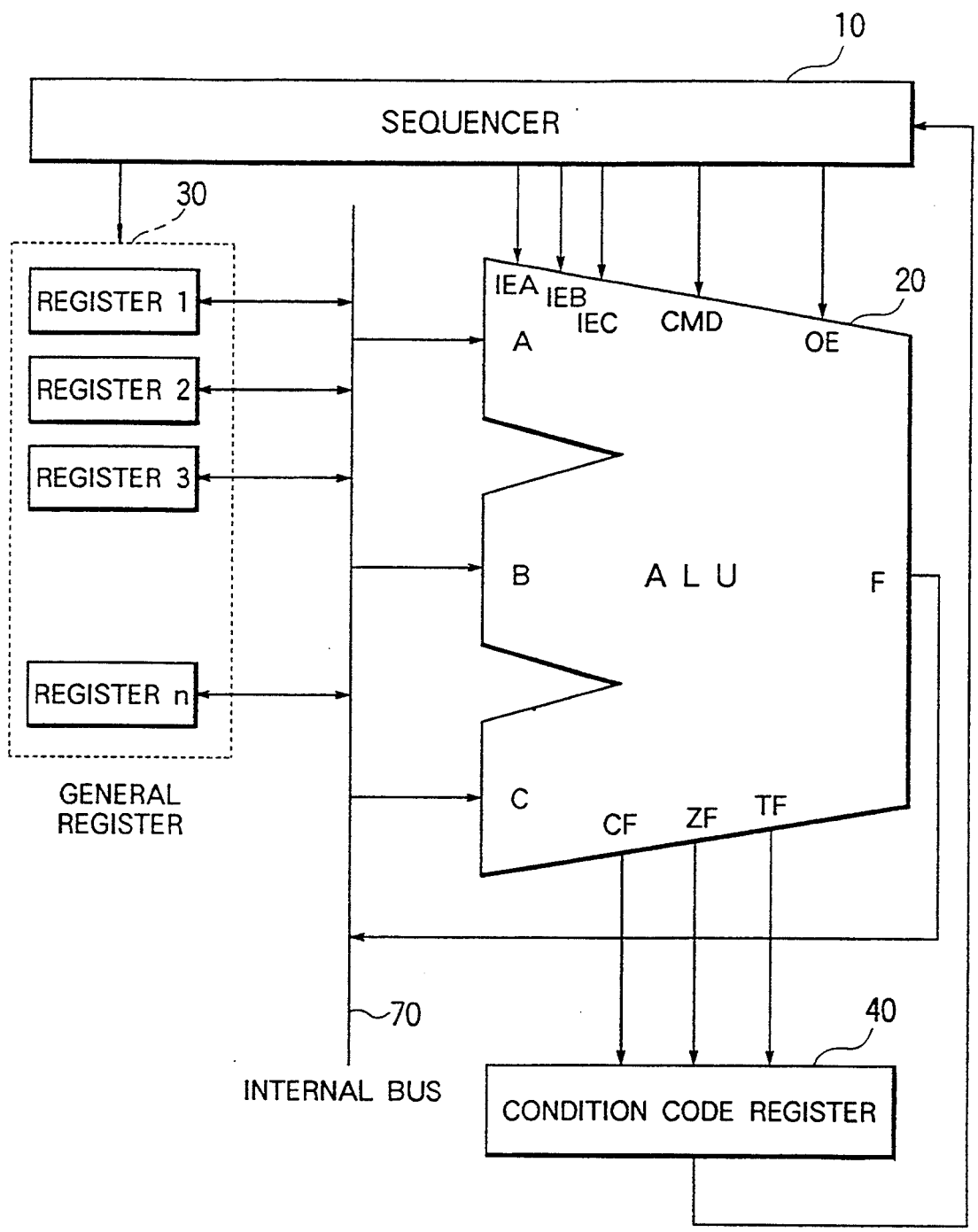
FIG. 30 a connection block diagram of ALU according to the second embodiment of the present invention.

2nd Embodiment:

FIG. 30 shows the internal structure of a microprocessor 1 according to the second embodiment of the present invention, in which an internal bus 70 is shared by all ports of an ALU.

In this embodiment, ALU 20 controls data inputs to ports A, B and C in accordance with three input enable signals IEA, IEB and IEC supplied from a sequencer 10.

Figure 31:
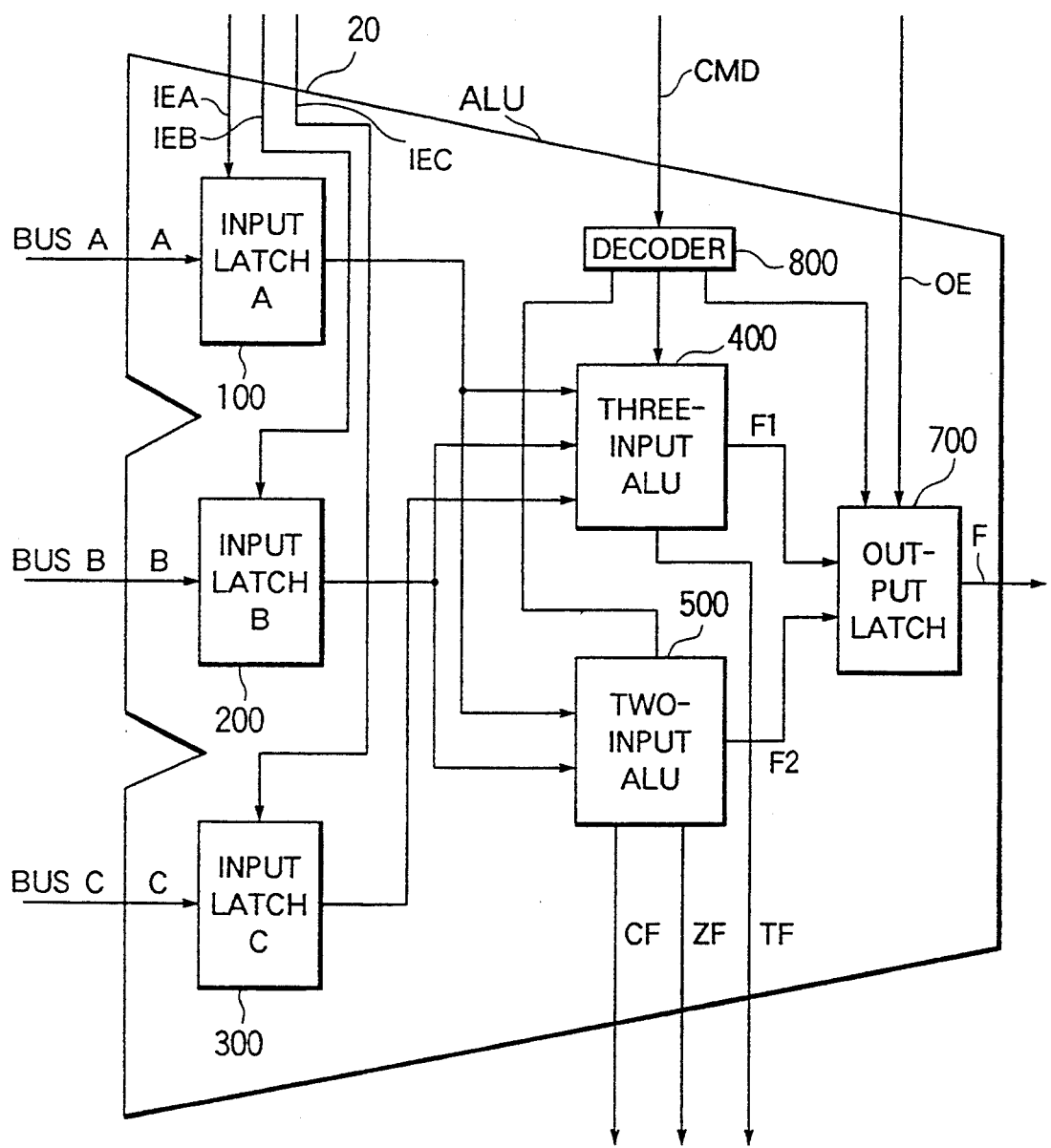
FIG. 31 is a block diagram showing the structure of ALU 20 of the second embodiment.

FIG. 31 shows an example of the internal structure of ALU 20 shown in FIG. 30. The input enable signal IEA controls data input to an input latch A. Similarly, the input enable signal IEB controls data input to an input latch B, and the input enable signal IEC controls data input to an input latch C. The other structure of ALU 20 is the same as that of the first embodiment.

Next, the operation flow of the sequencer 10 of this embodiment will be described below. The operation of retrieving an instruction from the instruction memory 2 and decoding it is the same as the first embodiment described with FIG. 12.

Figure 32:
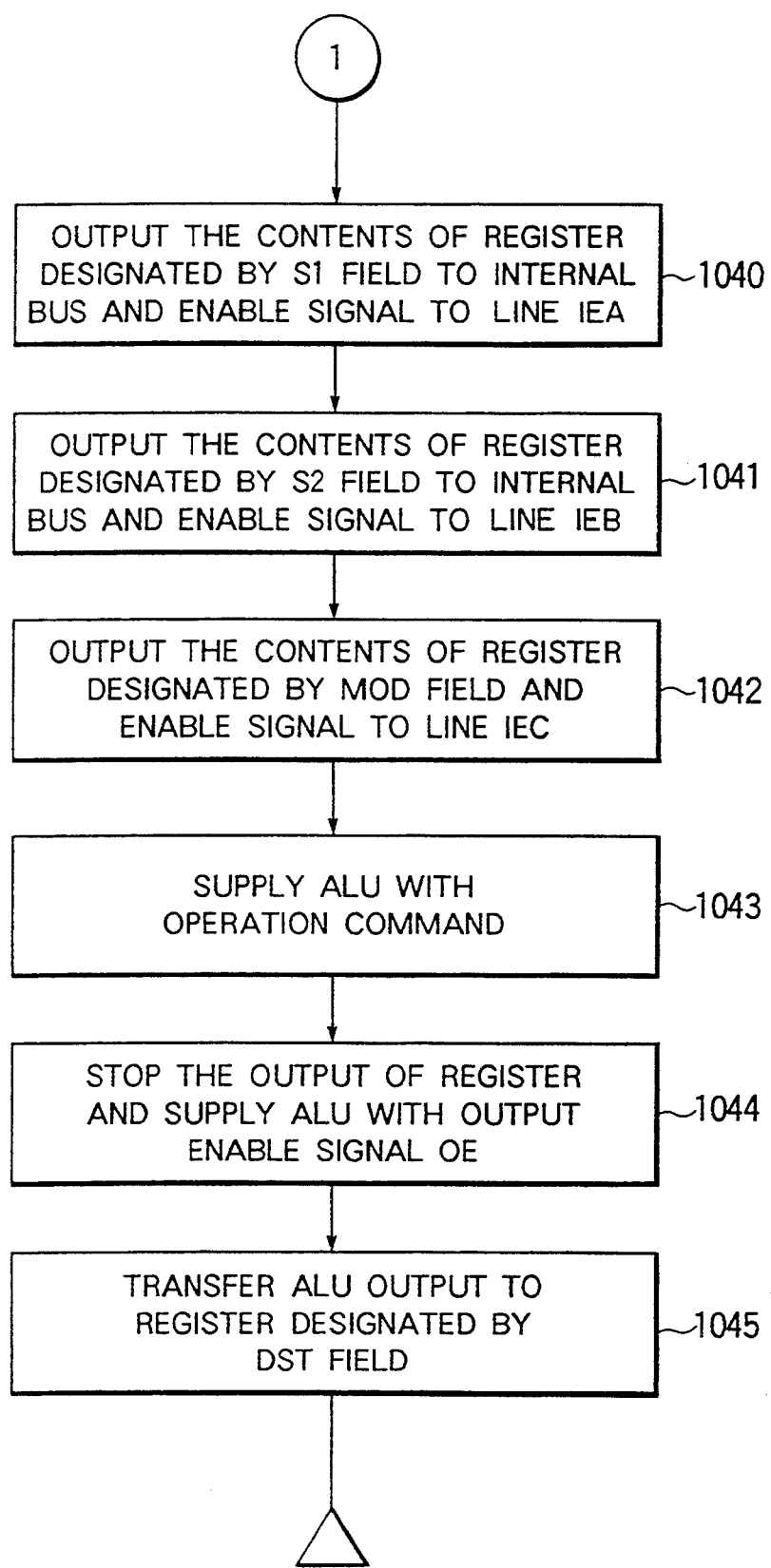
FIG. 32 is a flow chart showing the control operation of the sequencer 10 when executing a modulo addition/subtraction instruction according to the second embodiment.

FIG. 32 is a flow chart showing the control operation by the sequencer 10 of issuing a modulo addition instruction MADD or modulo subtraction instruction MSUB to ALU 20.

The sequencer 10 outputs the contents of the register designated by the S1 field of an instruction read from the instruction memory 2, to the internal data bus 70, and outputs the input enable signal IEA to ALU 20, to thereby input data on the data bus to the port A (input latch A) of ALU 20 (step 1040).

Next, the sequencer 10 outputs the contents of the register designated by the S2 field to the internal data bus 70, and outputs the input enable signal IEB to ALU 20, to thereby input data to the port B of ALU 20 (step 1041). Similarly, the sequencer 10 outputs the contents of the register designated by the S3 field to the internal data bus 70, and outputs the input enable signal IEC to ALU 20, to thereby input data to the port C of ALU 20 (step 1042).

Next, an instruction command CMD is supplied to ALU 20 (step 1043), and an output enable signal OE is supplied to ALU 20 while stopping the data output from the general registers 30 to the internal data bus 70 (step 1044). Data output from ALU 20 to the internal data bus 70 is transferred to the register designated by the DST field (step 1045).

Figure 33:
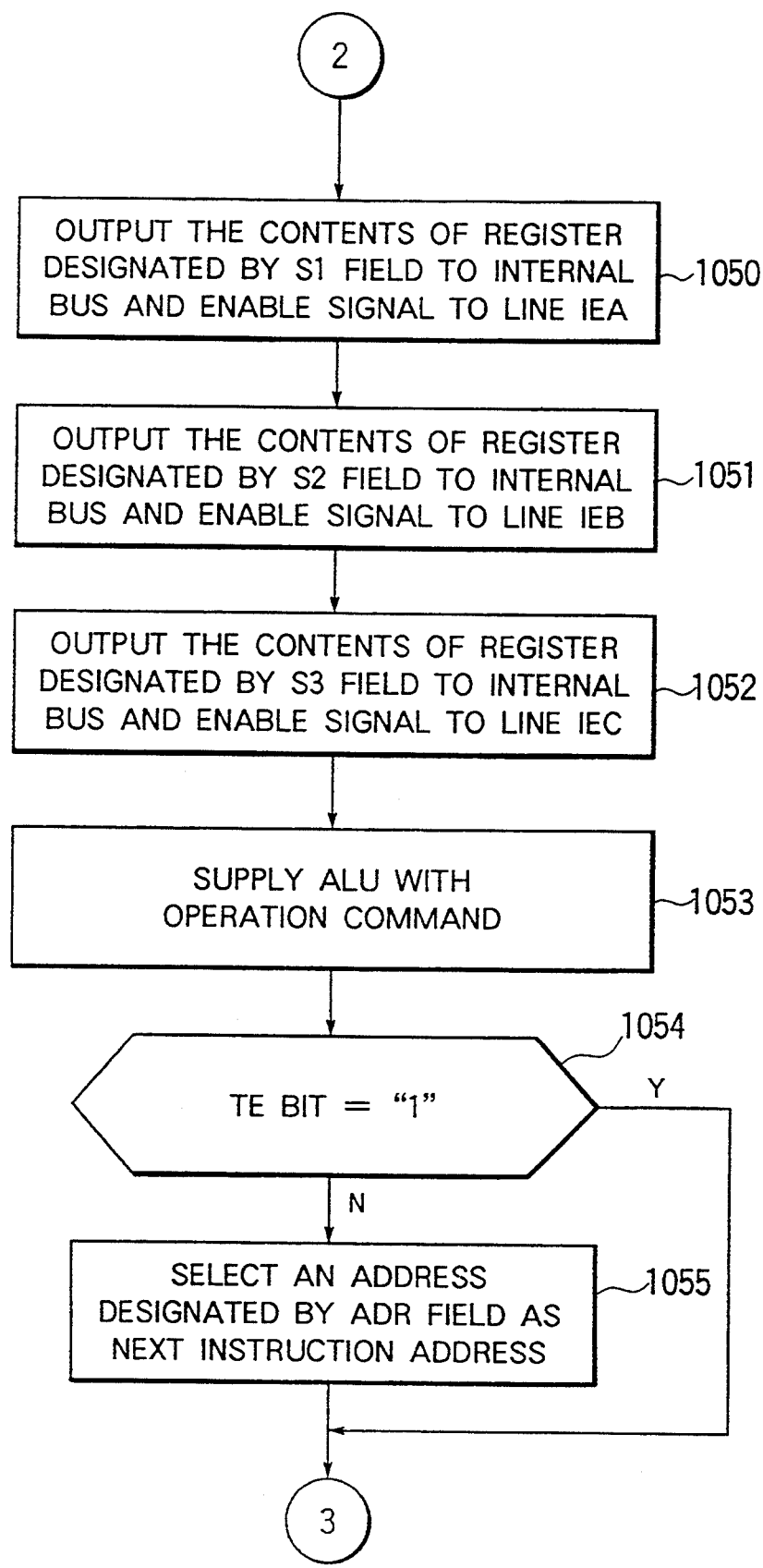
FIG. 33 a flow chart showing the control operation of the sequencer 10 when executing a three-input. comparison instruction according to the second embodiment.
Figure 34:
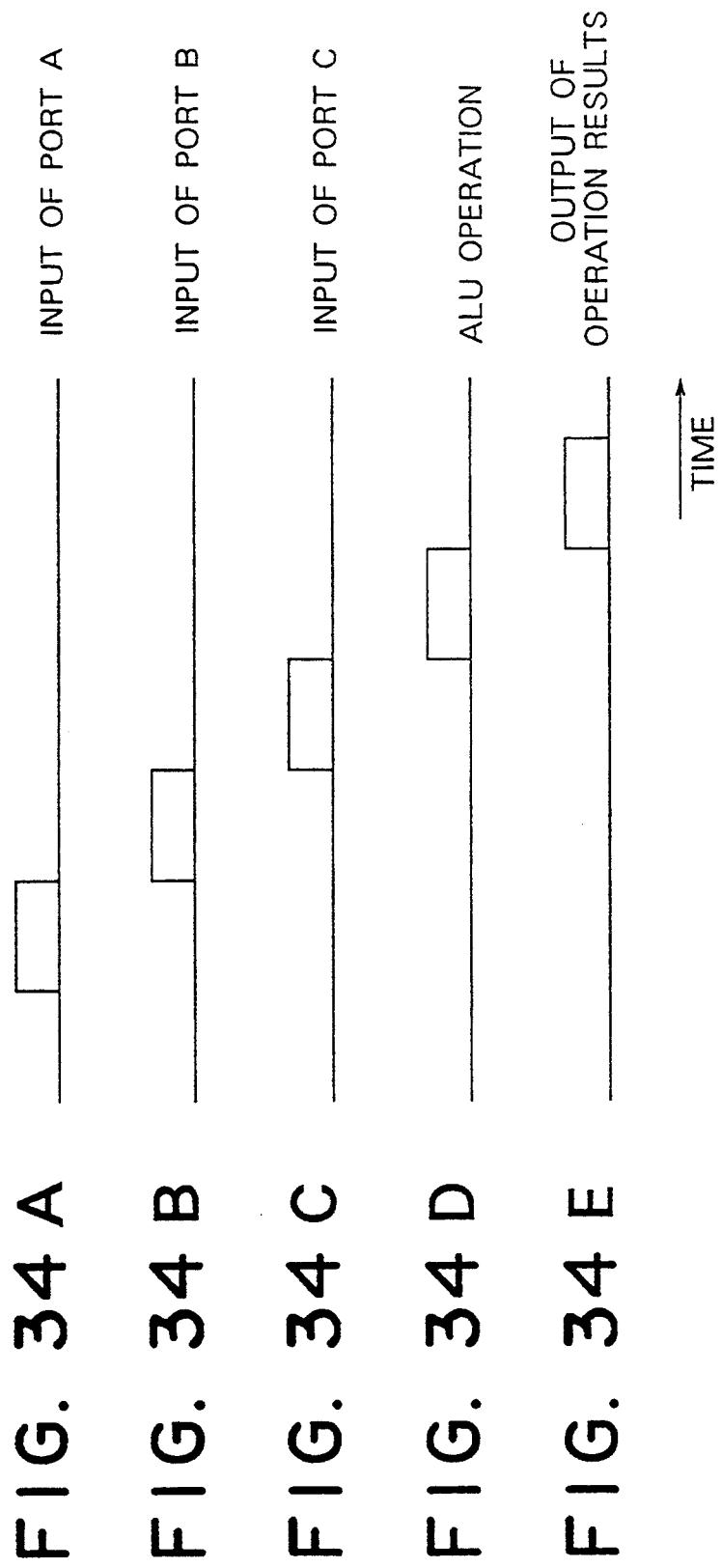
FIG. 34A to 34E are timing charts showing the operation of ALU 20 of the second embodiment.

FIG. 33 is a flow chart showing the control operation by the sequencer 10 of issuing a three-input modulo comparison instruction to ALU 20.

The sequencer 10 outputs the contents of the register designated by the S1 field of an instruction read from the instruction memory 2 to the internal data bus, and outputs the input enable signal IEA to ALU 20, to thereby input data to the port A of ALU 20 (step 1050).

Next, the sequencer 10 outputs the contents of the register designated by the S2 field to the internal data bus 70, and outputs the input enable signal IEB to ALU 20, to thereby input data to the port B of ALU 20 (step 1051). Similarly, the sequencer 10 outputs the contents of the register designated by the S3 field to the internal 40 data bus 70, and outputs the input enable signal IEC to ALU 20, to thereby input data to the port C of ALU 20 (step 1052).

Next, an instruction command CMD is supplied to ALU 20 (step 1053), and the state of the judgment flag TF representing the three-input comparison results of ALU 20 is fetched from the condition code register 40 to check the comparison results (step 1054). In this case, if the judgment flag TF bit is "1", an instruction immediately after the presently executed instruction is used as an instruction to be executed next, and if not "1", an instruction at the address designated by the ADR field is used as an instruction to be executed next (step 1055).

FIGS. 34A to 34E are timing charts showing the operation of ALU 20 of the second embodiment. In this embodiment, the microprocessor has a single internal data bus 70, and data for three-input operation cannot be supplied to ALU in parallel. Therefore, data inputs to the ports A, B and C, ALU operation and operation result output are sequentially executed. However, three-input operation can be executed by using a single instruction to ALU 20.

3rd Embodiment:

In the first and second embodiments, mask data necessary for modulo addition/subtraction is supplied to the data input port C of ALU 20 each time a modulo operation is carried out. There are some cases where the modulo value used in a communications protocol is not changed once it is determined by negotiation with a communications partner apparatus. In such a case where the modulo value is used as fixed value data during communications operation, the operation of inputting the modulo value to ALU 20 each time a modulo operation is carried out, is redundant. Particularly in the case where a plurality of data are sequentially supplied as in the case of the second embodiment, such operation becomes one of the reasons for increased operation time.

Figure 35:
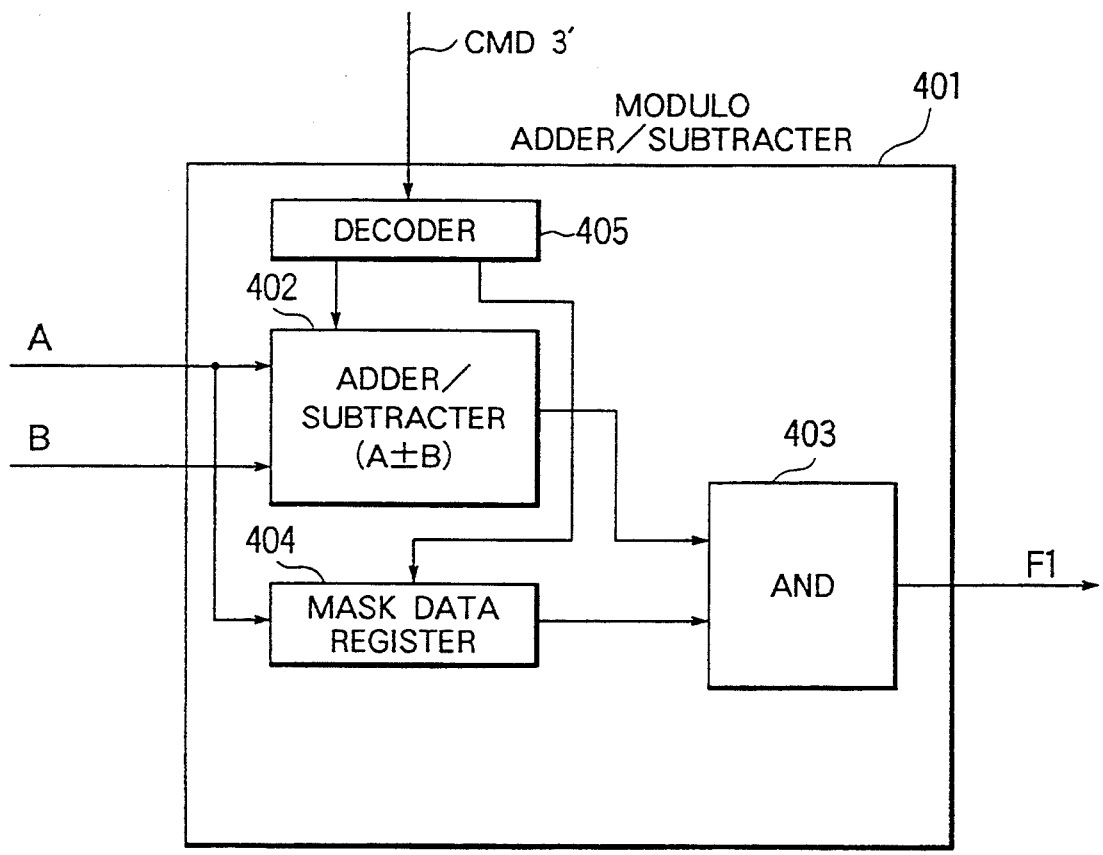
FIG. 35 is a block diagram showing another embodiment of the modulo adder/subtracter 401.

In the third embodiment, mask data necessary for modulo operation is stored in ALU. As shown in FIG. 35, a modulo adder/subtracter 401 is constructed of an adder/subtracter 402 and AND gate 403 like those shown in FIG. 18, a mask data register 404 for storing data input to the port A, and an instruction decoder 405. The instruction decoder 405 responds to an initialization instruction and an addition/subtraction instruction supplied from the sequencer 10, and selectively activates the mask data register 404 or adder/subtracter 402.

In this embodiment, the sequencer 10 supplies the initialization instruction to ALU prior to processing a communications protocol, to initially set the modulo value to the mask data register 404. Thereafter, when the modulo adder/subtracter 401 receives a modulo addition/subtraction instruction from the sequencer 10, it outputs the mask data in the mask data register 404 to the AND gate 403. According to this embodiment, the mask data necessary for modulo addition/subtraction is first stored in ALU 20 for later use. Therefore, it is not necessary to externally supply mask data to ALU 20 each time a modulo operation is carried out, thereby reducing an operation time.

As appreciated from the foregoing description, according to the present invention, there are provided an ALU to be used for modulo addition, subtraction and comparison, and specific instructions for such modulo operations. ALU and microprocessor suitable for executing a communications protocol can thus be realized.

We claim:

1. A microprocessor for executing an arithmetic-logic operation in response to each one of various types of instructions of a program, comprising:

first operation means for executing arithmetic operations in response to general instructions other than modulo instructions; and second operation means responsive to a modulo comparison instruction, for executing an arithmetic-logic operation of determining whether numeric data B cyclically changing within a predetermined range satisfies a predetermined condition with respect to boundary A and C, each having a modulo value.

2. A microprocessor according to claim 1, wherein said second operation means determines whether said numeric data B and boundary data A and C have a relationship of one of $A \leq B < C$ and $A < B \leq C$.

3. A microprocessor according to claim 2, further comprising third operation means for executing an arithmetic-logic operation of $(A \pm B)$ mod $(C+1)$ for designated data A, B and C, in response to a modulo addition/subtraction instruction.

4. A microprocessor according to claim 1, wherein said second operation means determines whether said numeric data B and boundary data A and C have a relationship of one of $A \leq B \leq C$, $A \leq B < C$, $A < B \leq C$ and $A < B < C$.

5. A microprocessor according to claim 4, further comprising third operation means for executing an arithmetic-logic operation of $(A \pm B) \bmod (C+1)$ for designated data A, B and C, in response to a modulo addition/subtraction instruction.

6. A microprocessor according to claim 1, further comprising third operation means for executing an arithmetic-logic operation of $(A \pm B) \bmod (C+1)$ for designated data A, B and C, in response to a modulo addition/subtraction instruction.

7. A data processing apparatus comprising:
a memory for storing instructions including at least one specific instruction for instructing execution of a predetermined modulo operation;
an internal bus;
an arithmetic-logic unit connected to said internal bus;
a general register connected to said internal bus; and
control means for reading an instruction to be executed from said memory, and, in accordance with said instruction, transferring data from said general register to said internal bus and supplying control signals to said arithmetic-logic unit to begin execution of a predetermined modulo operations,
wherein said arithmetic-logic unit includes a first operation circuit for executing general operations other than said predetermined modulo operation, a second operation circuit for executing said predetermined modulo operation, and output means for outputting the operation results of said second operation circuit as an output of said arithmetic-logic unit in response to one of said control signals generated by said control means, when said specific instruction is read out from said memory as an instruction to be executed, and
wherein said second operation circuit includes means for executing an arithmetic-logic operation of judging whether numeric data B cyclically changing within a predetermined range satisfies a predetermined condition with respect to boundary data A and C, each having a modulo value, said data A, B and C being input from said internal bus.

8. A data processing apparatus according to claim 7, wherein said second operation circuit includes means for determining whether said numeric data B and boundary data A and C have a relationship of one of $A \leq B < C$ and $A < B \leq C$.

9. A data processing apparatus according to claim 8, wherein said second operation circuit includes means for executing an arithmetic-logic operation of $(A \pm B) \bmod (C+1)$ for designating data A, B and C input from said internal bus.

10. A data processing apparatus according to claim 8, wherein said internal bus has a plurality of independent busses for supplying, in parallel, said data A, B and C to said second operation circuit.

11. A data processing apparatus according to claim 7, wherein said second operation circuit includes means for determining whether said numeric data B and boundary data A and C have a relationship of one of $A \leq B \leq C$, $A \leq B < C$, $A < B \leq C$ and $A < B < C$.

12. A data processing apparatus according to claim 11, wherein said second operation circuit includes means for executing an arithmetic-logic operation of $(A \pm B) \bmod (C+1)$ for designated data A, B and C input from said internal bus.

13. A data processing apparatus according to claim 11, wherein said internal bus has a plurality of independent busses for supplying, in parallel, said data A, B and C to said second operation circuit.

14. A data processing apparatus according to claim 7, wherein said second operation circuit includes means for executing an arithmetic-logic operation of $(A \pm B) \bmod (C+1)$ for designated data A, B and C input from said internal bus.

15. A data processing apparatus according to claim 14, wherein said internal bus has a plurality of independent busses for supplying, in parallel, said data A, B and C to said second operation circuit.

16. A data processing apparatus according to claim 7, wherein said internal bus has a plurality of independent busses for supplying, in parallel, said data A, B and C to said second operation circuit.

17. An arithmetic-logic unit for executing a predetermined operation of given data, said operation being specified by a microinstruction, comprising:
three data input ports for inputting data A, B and C;
input latches responsive to input enable signals for latching said input data A, B and C at said data input ports;
a first operation circuit for executing an arithmetic-logic operation of $(A \pm B) \bmod (C+1)$ for said input data A, B and C;
a second operation circuit for determining whether said input data A, B and C satisfy at least one of the relationships of $A \leq B \leq C$, $A \leq B < C$, $A < B \leq C$ and $A < B < C$ from a modulo operation viewpoint;
a third operation circuit for executing an arithmetic-logic operation of two of said data A, B, and C input from two of said input ports; and
means for selectively outputting one of the operation results of said operation first, second and third circuits in accordance with said microinstruction.

18. An arithmetic-logic unit according to claim 17, further comprising internal bus means for supplying said input data A, B and C in parallel to said input latches when either of said first and second operation circuits executes an arithmetic-logic operation.

19. An arithmetic-logic unit according to claim 18, wherein said first operation circuit includes register means for storing mask data necessary for a modulo operation, and said input data C is stored in said register means as an initial value to be repetitively used for the operations of said first operation circuit.

20. An arithmetic-logic unit according to claim 17, further comprising internal bus means for sequentially supplying said input data A, B and C to said input latches when either of said first and second operation circuits executes an arithmetic-logic operation.

21. An arithmetic-logic unit according to claim 20, wherein said first operation circuit includes register means for storing mask data necessary for a modulo operation, and said input data C is stored in said register means as an initial value to be repetitively used for the operations of said first operation circuit.

22. An arithmetic-logic unit according to claim 17, wherein said first operation circuit includes register means for storing mask data necessary for a modulo operation, and said input data C is stored in said register means as an initial value to be repetitively used for the operations of said first operation circuit.

23. A communication controller comprising:
first interface means for communicating with a host system;
second interface means for communicating with a network;

buffer memory means connected between said first and second interface means for temporarily storing data to be transmitted to said one of said host system and said network; and processor means coupled with said buffer memory means and said first and second interface means;

wherein said processor means comprises:

first modulo operation means responsive to a modulo comparison instruction for executing an arithmetic-logic operation of determining whether numeric data B satisfies a predetermined condition with respect to boundary data A and C, each having a modulo value;

second modulo operation means responsive to modulo addition/subtraction instructions, for executing an arithmetic-logic operation of $(A \pm B) \bmod (C+1)$ for designated data A, B and C; and third operation means responsive to instructions other than said modulo comparison and modulo addition/subtraction instructions, for executing arithmetic-logic operations other than that executed by said first and second modulo operation means.

* * * * *